US012604030B2

(12) United States Patent
Lee

(10) Patent No.: US 12,604,030 B2
(45) Date of Patent: *Apr. 14, 2026

(54) METHOD AND APPARATUS FOR PROCESSING VIDEO SIGNAL

(71) Applicant: KT CORPORATION, Gyeonggi-do (KR)

(72) Inventor: Bae Keun Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/955,926

(22) Filed: Nov. 21, 2024

(65) Prior Publication Data

US 2025/0088657 A1 Mar. 13, 2025

Related U.S. Application Data

(60) Continuation of application No. 17/409,056, filed on Aug. 23, 2021, now Pat. No. 12,184,886, which is a
(Continued)

(30) Foreign Application Priority Data

Mar. 19, 2018 (KR) ........................ 10-2018-0031547

(51) Int. Cl.
        *H04N 19/513*        (2014.01)
        *H04N 19/52*          (2014.01)
        (Continued)

(52) U.S. Cl.
        CPC .......... *H04N 19/521* (2014.11); *H04N 19/52* (2014.11); *H04N 19/577* (2014.11); *H04N 19/597* (2014.11)

(58) Field of Classification Search
        None
        See application file for complete search history.

(56) References Cited

U.S. PATENT DOCUMENTS

| 11,297,326 B2 | 4/2022 | Zhang et al. |
| 2013/0156335 A1 | 6/2013 | Lim et al. |

(Continued)

FOREIGN PATENT DOCUMENTS

| CN | 103096073 A | 5/2013 |
| CN | 106412603 A | 2/2017 |

(Continued)

OTHER PUBLICATIONS

Thomas Wiegand et al., "Overview of the H.264/AVC Video Coding Standard", IEEE Transactions On Circuits and Systems for Video Technology, Jul. 2003, pp. 560-576, vol. 13, No. 7.

(Continued)

*Primary Examiner* — Lindsay J Uhl
(74) *Attorney, Agent, or Firm* — IP Legal Services, LLC

(57) ABSTRACT

According to the present invention, there is provided a method of decoding an image, the method including: deriving a spatial merge candidate of a current block; generating a first merge candidate list including the spatial merge candidate; obtaining motion information of the current block on the basis of the first merge candidate list; and performing motion compensation on the current block by using the motion information. Herein, when the number of merge candidates included in the first merge candidate list is smaller than the maximum number, at least one merge candidate included in a second merge candidate list is added to the first merge candidate list.

7 Claims, 18 Drawing Sheets

Deriving spatial merge candidate of current block — S910

Deriving temporal merge candidate of current block — S920

Generating merge candidate list — S930

Specifying merge candidate based on merge index — S940

Determining motion information of current block based on motion information of merge candidate — S950

Related U.S. Application Data division of application No. 16/981,640, filed as application No. PCT/KR2019/003047 on Mar. 15, 2019, now Pat. No. 11,128,887.

(51) Int. Cl.
H04N 19/577 (2014.01)
H04N 19/597 (2014.01)

(56) References Cited

U.S. PATENT DOCUMENTS

| | | | |
|---|---|---|---|
| 2013/0230103 A1 | 9/2013 | Lim et al. | |
| 2014/0269916 A1 | 9/2014 | Lim et al. | |
| 2014/0294087 A1 | 10/2014 | Oh et al. | |
| 2014/0301461 A1 | 10/2014 | Jeon et al. | |
| 2014/0307789 A1 | 10/2014 | Kim et al. | |
| 2014/0341284 A1 | 11/2014 | Kim et al. | |
| 2015/0071347 A1 | 3/2015 | Oh et al. | |
| 2015/0071348 A1 | 3/2015 | Oh et al. | |
| 2015/0181229 A1* | 6/2015 | Lin | H04N 19/31 |
| | | | 375/240.02 |
| 2015/0382008 A1 | 12/2015 | Lim et al. | |
| 2015/0382013 A1 | 12/2015 | Lim et al. | |
| 2016/0044331 A1 | 2/2016 | Lim et al. | |
| 2016/0234497 A1 | 8/2016 | Oh et al. | |
| 2016/0234502 A1 | 8/2016 | Oh et al. | |
| 2016/0255361 A1 | 9/2016 | Lim et al. | |
| 2016/0269742 A1 | 9/2016 | Lim et al. | |
| 2016/0277749 A1 | 9/2016 | Lim et al. | |
| 2017/0054995 A1 | 2/2017 | Kim et al. | |
| 2017/0078673 A1 | 3/2017 | Kim et al. | |
| 2017/0105021 A1 | 4/2017 | Lim et al. | |
| 2017/0127059 A1 | 5/2017 | Kim et al. | |
| 2017/0142419 A1 | 5/2017 | Kim et al. | |
| 2017/0142420 A1 | 5/2017 | Kim et al. | |
| 2017/0163996 A1 | 6/2017 | Lim et al. | |
| 2017/0214922 A1 | 7/2017 | Jeon et al. | |
| 2017/0237978 A1 | 8/2017 | Kim et al. | |
| 2017/0237979 A1 | 8/2017 | Kim et al. | |
| 2017/0237993 A1 | 8/2017 | Kim et al. | |
| 2018/0027254 A1 | 1/2018 | Lim et al. | |
| 2018/0077418 A1 | 3/2018 | Kim et al. | |
| 2018/0109786 A1 | 4/2018 | Kim et al. | |
| 2018/0152710 A1 | 5/2018 | Oh et al. | |
| 2018/0199054 A1 | 7/2018 | Hsu | |
| 2018/0295361 A1* | 10/2018 | Kim | H04N 19/147 |
| 2018/0310002 A1 | 10/2018 | Kim et al. | |
| 2018/0316924 A1 | 11/2018 | Kim et al. | |
| 2018/0316925 A1 | 11/2018 | Kim et al. | |
| 2018/0376149 A1 | 12/2018 | Zhang et al. | |
| 2019/0007697 A1 | 1/2019 | Lim et al. | |
| 2019/0068978 A1 | 2/2019 | Jeon et al. | |
| 2019/0068988 A1 | 2/2019 | Lim et al. | |
| 2019/0200010 A1 | 6/2019 | Kim et al. | |
| 2019/0200040 A1 | 6/2019 | Lim et al. | |
| 2019/0246103 A1 | 8/2019 | Jun et al. | |
| 2019/0261006 A1 | 8/2019 | Kim et al. | |
| 2019/0320182 A1 | 10/2019 | Oh et al. | |
| 2019/0387243 A1 | 12/2019 | Lim et al. | |
| 2020/0045306 A1 | 2/2020 | Lee | |
| 2020/0099936 A1 | 3/2020 | Kim et al. | |
| 2020/0145666 A1 | 5/2020 | Kim et al. | |
| 2020/0195948 A1 | 6/2020 | Li et al. | |
| 2020/0195970 A1 | 6/2020 | Ikai et al. | |
| 2020/0221077 A1* | 7/2020 | Park | H04N 19/513 |
| 2020/0252643 A1 | 8/2020 | Lim et al. | |
| 2020/0275106 A1 | 8/2020 | Kim et al. | |
| 2020/0280724 A1 | 9/2020 | Jeon et al. | |
| 2021/0329260 A1 | 10/2021 | Jeon et al. | |
| 2022/0124363 A1 | 4/2022 | Lim et al. | |
| 2023/0147872 A1 | 5/2023 | Jeon et al. | |
| 2023/0239493 A1 | 7/2023 | Lim et al. | |

FOREIGN PATENT DOCUMENTS

| | | |
|---|---|---|
| CN | 107257476 A | 10/2017 |
| KR | 10-2010-0048435 A | 5/2010 |
| KR | 10-2011-0008653 A | 1/2011 |
| KR | 10-2011-0045908 A | 5/2011 |
| KR | 10-2011-0085896 A | 7/2011 |
| KR | 10-2013-0050406 A | 5/2013 |
| KR | 10-2013-0061721 A | 6/2013 |
| KR | 10-2014-0044403 A | 4/2014 |
| KR | 10-2014-0064944 A | 5/2014 |
| KR | 10-2018-0037600 A | 4/2018 |
| WO | 2013/070001 A1 | 5/2013 |

OTHER PUBLICATIONS

Toshiyasu Sugio et al., "Non-CE9: Simplified scaling calculation method for temporal/spatial MVP of AMVP/ Merge", Document: JCTVC-G541, Joint Collaborative Team on Video Coding (JCT-VC) of ITU-T SG16 WP3 and ISO/IEC JTC1/SC29/WG11, 7th Meeting: Geneva, CH, Nov. 21-30, 2011.

Jianle Chen et al., "MVP index parsing with fixed No. of candidates", Document: JCTVC-F402, Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-14.

Jianle Chen et al., "Algorithm Description of Joint Exploration Test Model 7 (JEM 7)", Document: JVET-G1001-v1, Joint Video Exploration Team (JVET) of ITU-T SG 16 WP 3 and ISO/IEC JTC 1/SC 29/WG 11, 7th Meeting: Torino, IT, Jul. 13-21, 2017.

China National Intellectual Property Administration, Notice of Allowance of corresponding CN Patent Application No. 201980031737.0, Jan. 4, 2024.

* cited by examiner

FIG. 2

Deriving spatial merge candidate of current block ~ S910

Deriving temporal merge candidate of current block ~ S920

Generating merge candidate list ~ S930

Specifying merge candidate based on merge index ~ S940

Determining motion information of current block based on motion information of merge candidate ~ S950

METHOD AND APPARATUS FOR PROCESSING VIDEO SIGNAL

CROSS REFERENCE TO RELATED APPLICATIONS

This application is a Continuation of U.S. patent application Ser. No. 17/409,056 (filed on Aug. 23, 2021), which is a Divisional of U.S. patent application Ser. No. 16/981,640 (filed on Sep. 16, 2020), now issued as U.S. Pat. No. 11,128,887, which is a National Stage Patent Application of PCT International Patent Application No. PCT/KR2019/003047 (filed on Mar. 15, 2019) under 35 U.S.C. § 371, which claims priority to Korean Patent Application No. 10-2018-0031547 (filed on Mar. 19, 2018), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An objective of the present invention is to provide a method and apparatus for effectively performing inter-prediction on an encoding/decoding target block when encoding/decoding a video signal.

Another objective of the present invention is to provide a method and apparatus for performing motion compensation by using a plurality of merge candidate list when encoding/decoding a video signal.

Still another objective of the present invention is to provide a method and apparatus for deriving a merge candidate on the basis of a block having a predetermined shape or predetermined size when encoding/decoding a video signal.

Still another objective of the present invention is to provide a method and apparatus for obtaining motion information based on a plurality of merge candidates.

Technical problems obtainable from the present invention are non-limited the above-mentioned technical task, and other unmentioned technical tasks can be clearly understood from the following description by those having ordinary skill in the technical field to which the present invention pertains.

Technical Solution

According to the present invention, there is provided a method and a device for decoding a video signal, wherein a spatial merge candidate of a current block is derived, a first merge candidate list including the spatial merge candidate is generated, motion information of the current block is acquired on the basis of the first merge candidate list, and motion compensation is performed on the current block by using the motion information. Herein, when the number of merge candidates included in the first merge candidate list is smaller than the maximum number, at least one merge candidate included in a second merge candidate list is added to the first merge candidate list.

According to the present invention, there is provided a method and a device for encoding a video signal, wherein a spatial merge candidate of a current block is derived, a first merge candidate list including the spatial merge candidate is generated, motion information of the current block is acquired on the basis of the first merge candidate list, and motion compensation is performed on the current block by using the motion information. Herein, when the number of merge candidates included in the first merge candidate list is smaller than the maximum number, at least one merge candidate included in a second merge candidate list is added to the first merge candidate list.

In the method and the device for encoding/decoding the video signal according to the present invention, the second merge candidate list may include a merge candidate derived on the basis of motion information of a block encoded/decoded before the current block.

In the method and the device for encoding/decoding the video signal according to the present invention, the merge candidate to be added to the first merge candidate list may be determined on the basis of index values of merge candidates included in the second merge candidate list.

In the method and the device for encoding/decoding the video signal according to the present invention, the second merge candidate list may include a merge candidate derived on the basis of motion information of a second neighboring block that is adjacent to a first neighboring block adjacent to the current block.

In the method and the device for encoding/decoding the video signal according to the present invention, even after the at least one merge candidate included in the second merge candidate list is added to the first merge candidate list, when the number of the merge candidates included in the first merge candidate list is smaller than the maximum number, a combined merge candidate generated on the basis of two or more merge candidates included in the first merge candidate list is added to the first merge candidate list. Herein, a motion vector of the combined merge candidate may be determined using an average value of motion vectors of the two or more merge candidates.

In the method and the device for encoding/decoding the video signal according to the present invention, a motion vector of the current block may be determined using an average value of the multiple merge candidates included in the first merge candidate list.

In the method and the device for encoding/decoding the video signal according to the present invention, the motion information of the current block may be acquired on the basis of a first merge candidate and a second merge candidate included in the first merge candidate list.

It is to be understood that the foregoing summarized features are exemplary aspects of the following detailed description of the present invention without limiting the scope of the present invention.

Advantageous Effects

According to the present invention, efficiency of inter-prediction can be enhanced by performing motion compensation by using a plurality of merge candidate lists.

According to the present invention, efficiency of inter-prediction can be enhanced by deriving a merge candidate on the basis of a block having a predetermined shape or predetermined size.

According to the present invention, efficiency of inter-prediction can be enhanced by obtaining motion information based on a plurality of merge candidates.

Effects obtainable from the present invention may be non-limited by the above mentioned effect, and other unmentioned effects can be clearly understood from the following description by those having ordinary skill in the technical field to which the present invention pertains.

DESCRIPTION OF DRAWINGS

FIG. 2 is a block diagram illustrating a device for decoding a video according to an embodiment of the present invention.

MODE FOR INVENTION

Figure 1:
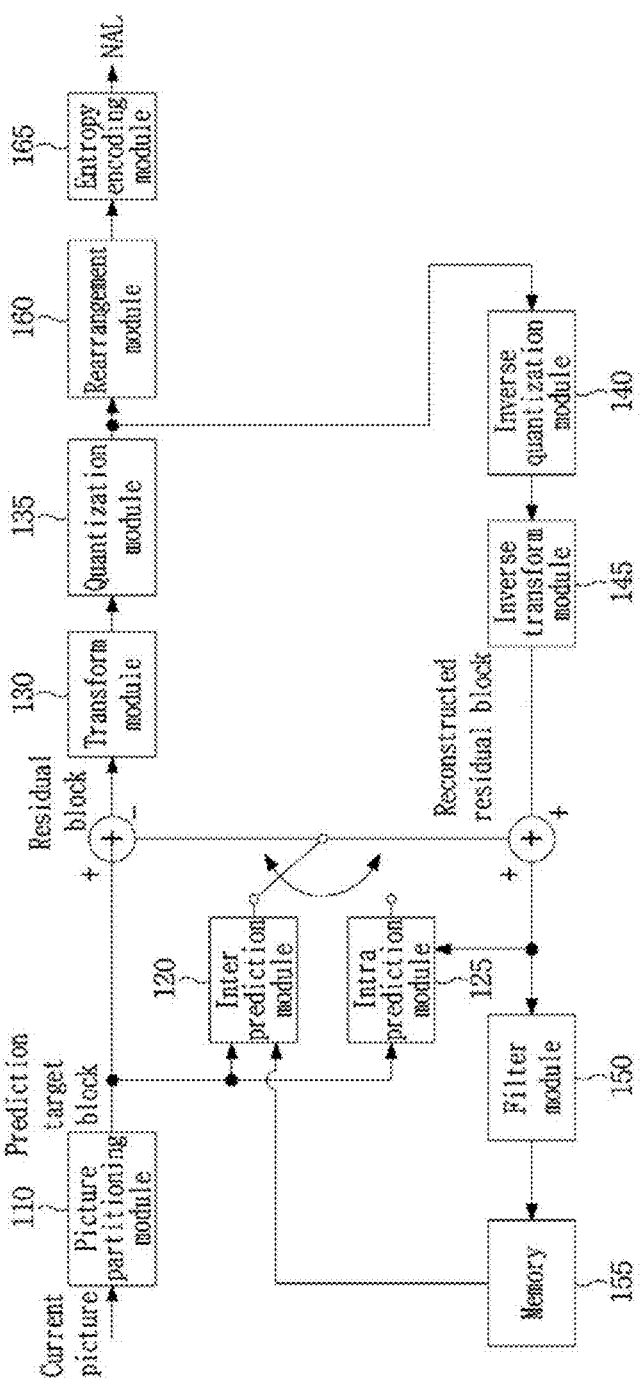
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the "first" component may be named the 'second' component without departing from the scope of the present invention, and the 'second' component may also be similarly named the 'first' component. The term 'and/or' includes a combination of a plurality of items or any one of a plurality of terms.

In the present disclosure, when an element is referred to as being "connected" or "coupled" to another element, it is understood to include not only that the element is directly connected or coupled to that another element but also that there may be another element therebetween. When an element is referred to as being "directly connected" or "directly coupled" to another element, it is understood that there is no other element therebetween.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, once picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
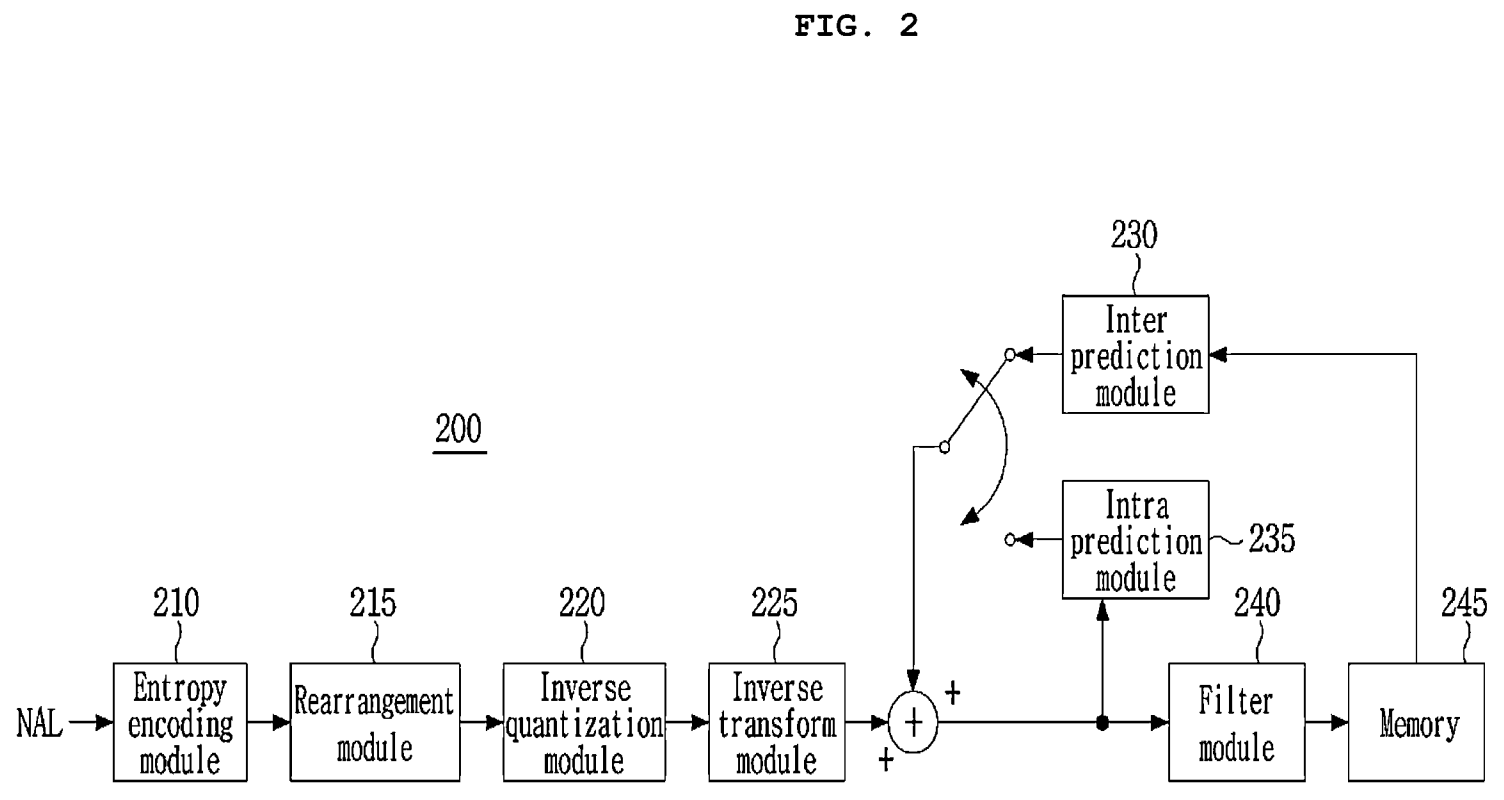

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video. The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module

215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by being divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Partitioning of a coding tree unit or a coding unit may be performed based on at least one of a vertical line or a horizontal line. In addition, the number of vertical lines or horizontal lines partitioning a coding tree unit or a coding unit may be at least one. For example, by using one vertical line or one horizontal line, a coding tree unit or a coding unit may be partitioned into two partitions, or by using two vertical lines or two horizontal lines, a coding tree unit or a coding unit may be partitioned into three partitions. Alternatively, by using one vertical line and one horizontal line, a coding tree unit or a coding unit may be partitioned into four partitions having a length and width of ½.

When a coding tree unit or a coding unit is partitioned into a plurality of partitions using at least one vertical line or at least one horizontal line, the partitions may have a uniform size or may have different sizes. Alternatively, a partition may have a different size than the other partition.

In the embodiments described below, it is assumed that a coding tree unit or a coding unit is partitioned into a quad tree, triple tree, or binary tree structure. However, a coding tree unit or a coding unit may be partitioned using more vertical lines or more horizontal lines.

Figure 3:
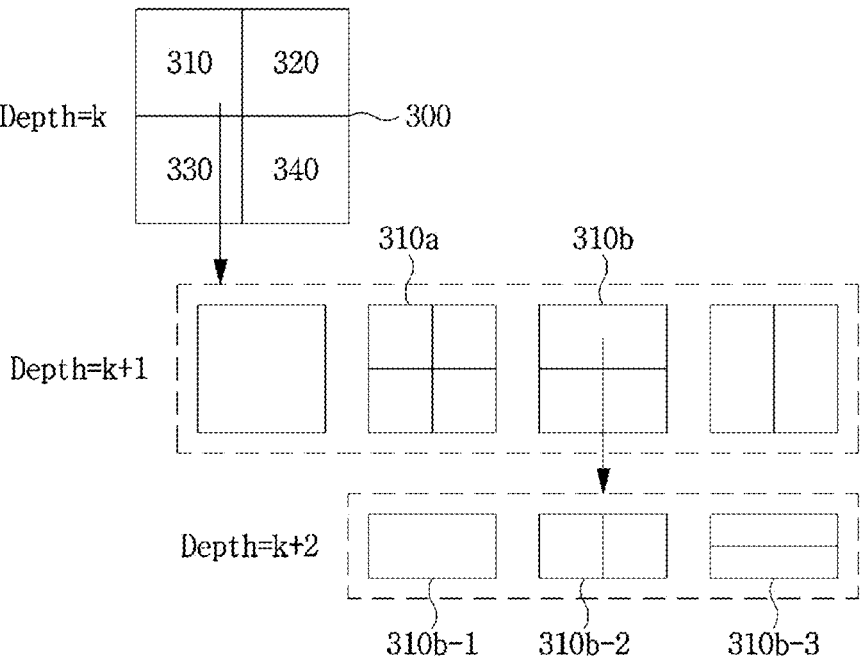
FIG. 3 is a diagram illustrating an example of hierarchically partitioning a coding block based on a tree structure as an embodiment to which the present invention is applied.

FIG. 3 is a diagram illustrating an example of hierarchically partitioning a coding block based on a tree structure as an embodiment to which the present invention is applied.

The input video signal is decoded in a unit of a predetermined block, and the base unit for decoding the input video signal is referred to as a coding block. The coding block may be a unit for performing intra/inter prediction, transformation, quantization. In addition, a prediction mode (e.g., intra prediction mode or inter prediction mode) may be determined in a unit of a coding block, and prediction blocks included in the coding block may share the determined prediction mode. A coding block may be a square or non-square block with any size in the range 8×8 to 64×64, and may be a square or non-square block with a size of 128×128, 256×256 or more.

Specifically, a coding block may be hierarchically partitioned based on at least one of a quad tree, a triple tree, and a binary tree. Here, quad tree-based partitioning may correspond to a method in which a 2N×2N coding block is partitioned into four N×N coding blocks, triple tree-based partitioning may correspond to a method in which one coding block is partitioned into three coding blocks, and binary tree-based partitioning may correspond to a method in which one coding block is partitioned into two coding blocks. Even when triple tree-based or binary tree-based partitioning is performed, a square coding block may exist at a lower depth. Alternatively, after triple tree-based or binary tree-based partitioning is performed, generating a square coding block may be limited at a lower depth.

Figure 4:
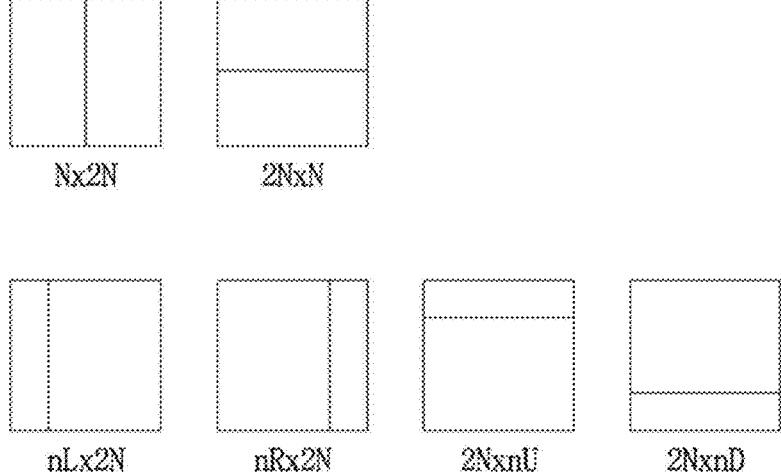
FIG. 4 is a diagram illustrating a partition type in which a binary tree-based partitioning is allowed as an embodiment to which the present invention is applied.

Binary tree-based partitioning may be performed symmetrically or asymmetrically. A coding block partitioned based on a binary tree may be a square block or a non-square block such as a rectangle. For example, a partition type that allows binary tree-based partitioning may include at least one of 2N×N (horizontal non-square coding unit) or N×2N (vertical non-square coding unit) which are examples of symmetric, nL×2N, nR×2N, 2N×nU or 2N×nD which are examples of asymmetric, as in the example shown in FIG. 4.

Binary tree-based partitioning may limitedly allow either symmetric partition or asymmetric partition. In this case, configuring a coding tree unit as a square block may correspond to quad tree CU partitioning, and configuring a coding tree unit as a symmetric non-square block may correspond to binary tree partitioning. Configuring a coding tree unit into a square block and a symmetric non-square block may correspond to quad and binary tree CU partitioning.

Binary tree-based partitioning may be performed on a coding block in which quad tree-based partitioning is no longer performed. A coding block partitioned based on a binary tree may be configured such that at least one of quad tree-based partitioning, triple tree-based partitioning, or binary tree-based partitioning is no longer performed.

Alternatively, triple tree-based partitioning or binary tree-based partitioning may be allowed for a coding block partitioned based on a binary tree, and only one of a horizontal or vertical partitioning may be limited allowed.

For example, according to a position, an index, a shape, an additional partitioning shape of a neighboring partition, or the like of a coding block partitioned based on a binary tree, additional partitioning or additional partitioning direction may be limited for a coding block partitioned based on a binary tree. For example, among two coding blocks generated by a binary tree-based partitioning, assuming that an index of a coding block having an earlier coding order is 0 (hereinafter, referred to as a coding block index 0) and an index of a coding block having a later coding order is 1 (hereinafter, referred to as coding block index 1), when a binary tree-based partitioning is applied both of coding blocks of coding block index 0 and coding block index 1, a binary tree-based partitioning direction of the coding block having coding block index 1 may be determined according to a binary tree-based partitioning direction of the coding block having coding block index 0. Specifically, when a binary tree-based partitioning direction of the coding block having coding block index 0 partitions the coding block having coding block index of 0 into square partitions, a binary tree-based partitioning of the coding block having coding block index 1 may have a different direction from a binary tree-based partitioning of the coding block having coding block index 1. That is, partitioning both of the coding blocks having coding block index 0 and coding block index 1 into square partitions may be limited. In this case, encoding/decoding of information indicating a binary tree partitioning direction of a coding block having coding block index 1 may be omitted. Partitioning both of the coding blocks having coding block index 0 and coding block index 1 into square partitions has the same effect as partitioning an upper depth block based on a quad tree, and thus allowing partitioning both of the coding blocks having coding block index 0 and coding block index 1 into square partitions is undesirable in terms of coding efficiency.

Triple tree-based partitioning means partitioning a coding block into three partitions in a horizontal or vertical direction. All three partitions generated by triple tree-based partitioning may have different sizes. Alternatively, two of the partitions generated by triple tree-based partitioning may have the same size, and the other one may have a different size. For example, the width ratio or height ratio of partitions generated by partitioning a coding block may be set to 1:n:1, 1:1:n, n:1:1 or m:n:1 depending on a partitioning direction. Here, m and n may be 1 or a real number greater than 1, for example, an integer such as 2.

Triple tree-based partitioning may be performed on a coding block in which quad tree-based partitioning is no longer performed. For a coding block partitioned based on a triple tree, it may be configured that at least one of quad tree-based partitioning, triple tree-based partitioning, or binary tree-based partitioning is no longer performed.

Alternatively, triple tree-based partitioning or binary tree-based partitioning may be allowed for a coding block partitioned based on a triple tree, and only one of horizontal partitioning or vertical partitioning may be limitedly allowed.

For example, according to a position, an index, a shape, an additional partitioning shape of a neighboring partition, or the like of a coding block partitioned based on a triple tree, additional partitioning or additional partitioning direction may be limited for a coding block partitioned based on a triple tree. For example, one of horizontal partitioning or vertical partitioning may be limited to a partition having the largest size among coding blocks generated by triple tree-based partitioning. Specifically, for a partition having the largest size among coding blocks generated by triple tree-based partitioning, binary tree partitioning or triple tree partitioning having the same direction as the triple tree partitioning direction of an upper depth partition may not be allowed. In this case, for a partition having the largest size among coding blocks generated by triple tree-based partitioning, encoding/decoding of information indicating a binary tree partitioning direction or a triple tree partitioning direction may be omitted.

Depending on a size or shape of a current block, partitioning based on a binary tree or triple tree may be limited. Here, the size of the current block may be expressed based on at least one of the width, height, minimum/maximum of width/height, summation of width and height, multiplication of width and height of the current block, or the number of samples included in the current block. For example, when at least one of the width or height of the current block is larger than a predefined value, partitioning based on a binary tree or triple tree may not be allowed. Here, the predefined value may be an integer such as 16, 32, 64, or 128. As another example, when the width-to-height ratio of the current block is larger than a predefined value or smaller than a predefined value, partitioning based on a binary tree or triple tree may not be allowed. When the predefined value is 1, partitioning based on a binary tree or triple tree may be allowed only when the current block is a square block having the same width and height.

Partitioning of a lower depth may be dependently determined based on a partitioning shape of an upper depth. For example, when binary tree-based partitioning is allowed in two or more depths, binary tree-based partitioning of the same shape as a binary tree partitioning of an upper depth may be allowed in a lower depth. For example, when binary tree-based partitioning of 2N×N shape is performed at an upper depth, binary tree-based partitioning of 2N×N shape may also be performed at a lower depth. Alternatively, when binary tree-based partitioning of N×2N shape is performed at an upper depth, binary tree-based partitioning of N×2N shape may also be performed at a lower depth.

In addition, only binary tree-based partitioning of a shape different from a binary tree partitioning shape of an upper depth may be allowed in a lower depth.

For a sequence, slice, coding tree unit, or coding unit, it may be limited such that only a specific shape of binary tree-based partitioning or a specific shape of triple tree-based partitioning is to be used. For example, it may be limited to allow only binary tree-based partitioning of 2N×N or N×2N shape for a coding tree unit. The allowed partition type may be predefined in an encoder or decoder, or may be signaled through a bitstream by encoding information on an allowed partition type or non-allowed partition type.

Figure 5A:
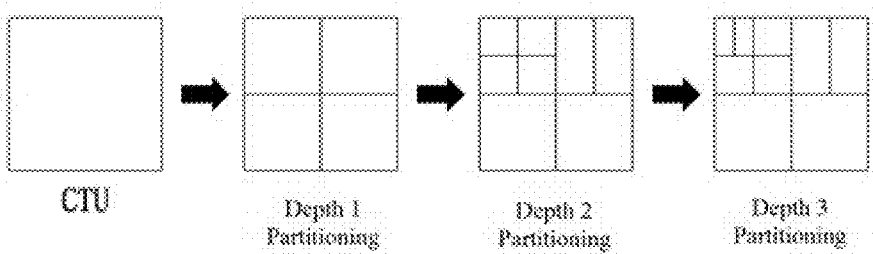
FIGS. 5A and 5B are diagrams illustrating an example in which only a specific shape of binary tree-based partitioning is allowed.
Figure 5B:
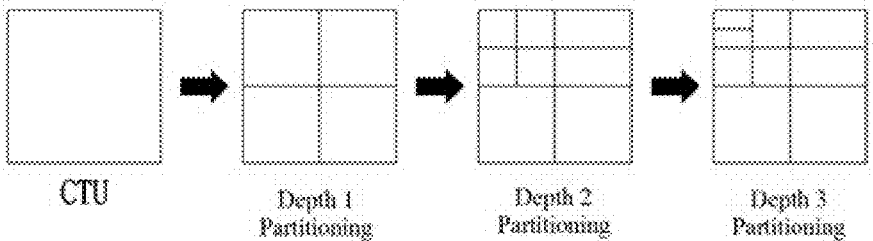

FIGS. 5A and 5B are diagrams illustrating an example in which only a specific shape of binary tree-based partitioning is allowed. In FIG. 5A, illustrates an example in which only N×2N shape of binary tree-based partitioning is allowed, and 5B illustrates an example in which only 2N×N shape of binary tree-based partitioning is allowed. For implementing adaptive partitioning based on a quad tree or binary tree, information indicating quad tree-based partitioning, information on a size/depth of a coding block that allows quad tree-based partitioning, information indicating binary tree-based partitioning, information on a size/depth of a coding block that allows binary tree-based partitioning, information on a size/depth of a coding block that does not allow binary tree-based partitioning, information whether a binary tree-based partitioning is vertical or horizontal, or the like may be used.

In addition, for a coding tree unit or a predetermined coding unit, a number of times that binary tree partitioning/triple tree partitioning is allowed, a depth that binary tree partitioning/triple tree partitioning is allowed, a number of depths that binary tree partitioning/triple tree partitioning is allowed, or the like may be obtained. The information may be encoded in a unit of a coding tree unit or a coding unit and transmitted to a decoder through a bitstream.

For example, through a bitstream, a syntax 'max_binary_depth_idx_minus1' indicating a maximum depth that binary tree partitioning is allowed may be encoded/decoded. In this case, max_binary_depth_idx_minus1+1 may indicate the maximum depth that binary tree partitioning is allowed.

Figure 6:
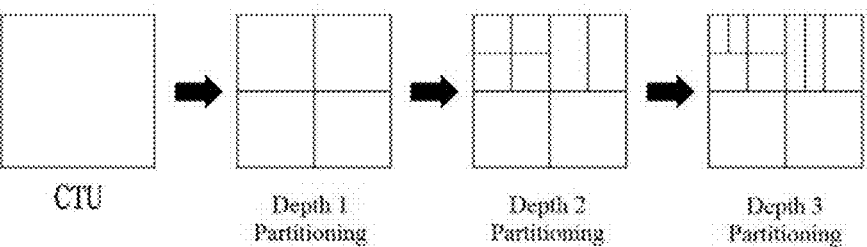
FIG. 6 is a diagram for describing an example in which information related to a number of times allowed for a binary tree partitioning is encoded/decoded according to an embodiment to which the present invention is applied.

Referring to the example shown in FIG. 6, in FIG. 6, it is shown that binary tree partitioning is performed for a coding unit having a depth of 2 and a coding unit having a depth of 3. Accordingly, at least one of information indicating the number of times (2 times) that binary tree partitioning has been performed in the coding tree unit, information indicating the maximum depth (depth 3) that binary tree partitioning is allowed in the coding tree unit, or the number of depths (2 depths, depth 2 and depth 3) that binary tree partitioning is allowed in the coding tree unit may be encoded/decoded through the bitstream.

As another example, at least one of a number of times that binary tree partitioning/triple tree partitioning is allowed, a depth that binary tree partitioning/triple tree partitioning is allowed, or a number of depths that binary tree partitioning/triple tree partitioning is allowed may be obtained for each sequence, picture, or slice. For example, the information may be encoded in a unit of a sequence, a picture or a slice and transmitted through a bitstream. Alternatively, a depth that binary tree partitioning/triple tree partitioning is allowed, a number of depths that binary tree partitioning/triple tree partitioning is allowed may be predefined for each sequence, picture, or slice. Accordingly, for a first slice and a second slice, at least one of a number of times that binary tree partitioning/triple tree partitioning is allowed, a depth that binary tree partitioning/triple tree partitioning is allowed, or a number of depths that binary tree partitioning/triple tree partitioning is allowed may differ. For example, in the first slice, binary tree partitioning may be allowed only at one depth, while in the second slice, binary tree partitioning may be allowed at two depths.

As another example, at least one of a number of times that binary tree/triple tree partitioning is allowed, a depth that binary tree/triple tree partitioning is allowed, or a number of depths that binary tree/triple tree partitioning is allowed may be set differently according to a temporal level identifier (TemporalID) of a slice or picture. Here, the temporal level identifier (TemporalID) is used to identify each of a plurality of layers of an image having a scalability of at least one of view, spatial, temporal, or quality.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310*a* having the half width and the half height of the second coding block, and the partition depth of the third coding block 310*a* may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310*a* may be determined as a leaf coding block, or may be further partitioned based on the quad tree or the binary tree.

In the meantime, the third coding block 310*b* partitioned based on the binary tree may be further partitioned into coding blocks 310*b*-2 of a vertical direction or coding blocks 310*b*-3 of a horizontal direction based on the binary tree, and the partition depth of the relevant coding blocks may be increased to k+3. Alternatively, the third coding block 310*b* may be determined as a leaf coding block 310*b*-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree, a binary tree, and a triple tree, a coding unit may be represented as square or rectangular shape of an arbitrary size.

A coding block may be encoded/decoded using at least one of a skip mode, an intra prediction, an inter prediction, or a skip method.

As another example, intra prediction or inter prediction may be performed in a unit having a size equal to or smaller than a coding block through partitioning of the coding block. To this end, when a coding block is determined, a prediction block may be determined through predictive partitioning of the coding block. Predictive partitioning of a coding block may be performed by a partition mode (Part_mode) indicating a partition type of the coding block. The size or shape of the prediction block may be determined according to the partition mode of the coding block. For example, the size of the prediction block determined according to the partition mode may have a value equal to or smaller than the size of the coding block.

Figure 7:
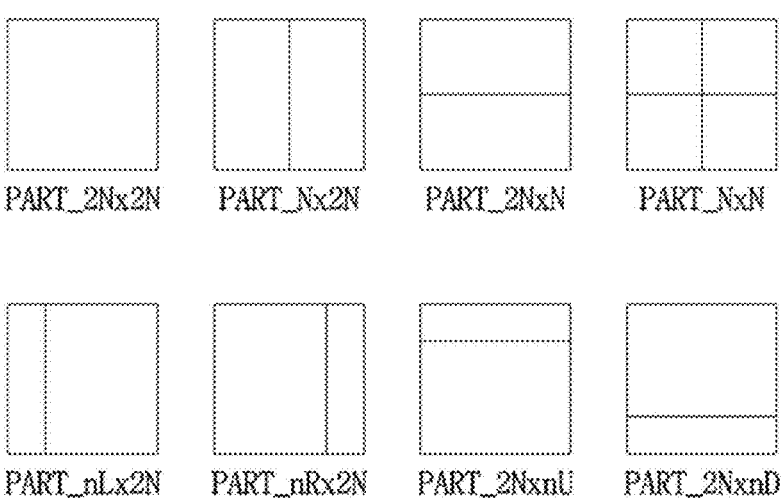
FIG. 7 is a diagram illustrating a partition mode that may be applied to a coding block as an embodiment to which the present invention is applied.

FIG. 7 is a diagram illustrating a partition mode that may be applied to a coding block when the coding block is encoded by inter prediction.

When a coding block is encoded by inter prediction, any one of eight partition modes may be applied to the coding block, as in the example illustrated in FIG. 7.

When a coding block is encoded by intra prediction, partition mode PART_2N×2N or PART_N×N may be applied to the coding block.

PART_N×N may be applied when a coding block has a minimum size. Here, the minimum size of the coding block may be predefined in an encoder and a decoder. Alternatively, information on the minimum size of the coding block may be signaled through a bitstream. For example, the minimum size of the coding block may be signaled through a slice header, and accordingly, the minimum size of the coding block may be defined for each slice.

In general, a size of a prediction block may have a size of 64×64 to 4×4. However, when a coding block is encoded by inter prediction, when a motion compensation is performed, a prediction block may not have a size of 4×4 in order to reduce a memory bandwidth.

Figure 8:
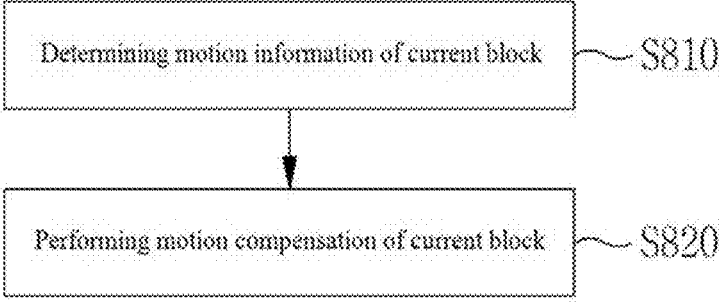
FIG. 8 is a flowchart illustrating an inter prediction method as an embodiment to which the present invention is applied.

FIG. 8 is a flowchart illustrating an inter prediction method as an embodiment to which the present invention is applied.

FIG. 8 is a flowchart illustrating an inter prediction method as an embodiment to which the present invention is applied.

Referring to FIG. 8, motion information of a current block may be determined S810. The motion information of the current block may include at least one of a motion vector of the current block, a reference picture index of the current block, or an inter prediction direction or a weight of weighted prediction of the current block. The weight of weighted prediction may represent a weight applying to an L0 reference block and a weight applying to an L1 reference block.

The motion vector of the current block may be determined on the basis of information signaled through a bitstream. The precision of the motion vector represents the basic unit of display of the motion vector of the current block. For example, the precision of motion vector of the current block may be determined to be at least one among an integer pel, a ½ pel, a ¼ pel, and a ⅛ pel. The precision of motion vector may be determined on a per-picture basis, a per-slice basis, a per-tile group basis, a per-tile basis, or a per-block basis. The block may represent a coding tree unit, a coding unit, a prediction unit, or a transform unit.

The motion information of the current block may be obtained based on at least one of information signaled through a bitstream or motion information of a neighboring block neighboring the current block.

Figure 9:
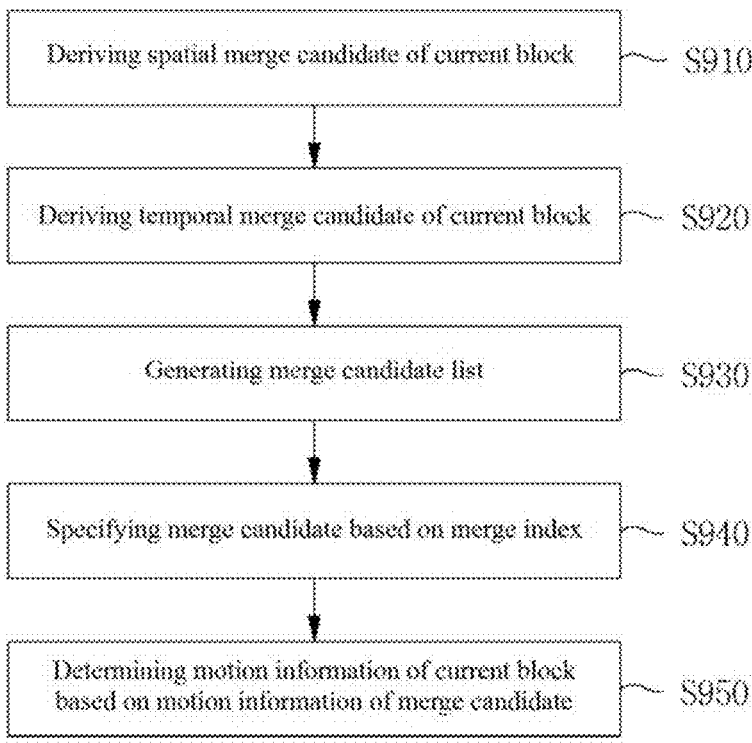
FIG. 9 is a diagram illustrating a procedure of deriving motion information of a current block when a merge mode is applied to the current block.

FIG. 9 is a diagram illustrating a procedure of deriving motion information of a current block when a merge mode is applied to the current block.

A merge mode represents a method of deriving motion information of a current block from a neighboring block.

When a merge mode is applied to a current block, a spatial merge candidate may be derived from a spatial neighboring block of a current block S910. The spatial neighboring block may include at least one of a block adjacent to a top boundary, left boundary, or corner (e.g., at least one of a top left corner, a right top corner, or a left bottom corner) of the current block.

Figure 10:
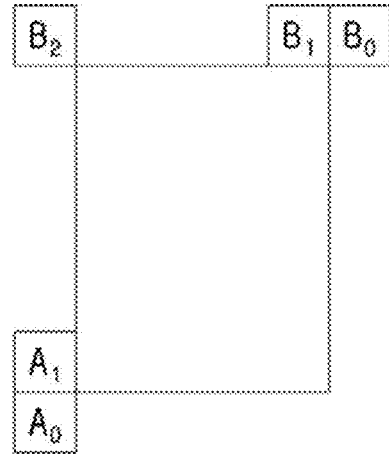
FIG. 10 is a diagram showing an example of a spatial neighboring block.

FIG. 10 is a diagram showing an example of a spatial neighboring block.

As an example shown in FIG. 10, a spatial neighboring block may include at least one of a neighboring block $A_1$ adjacent to a left of a current block, a neighboring block B1 adjacent to a top of the current block, a neighboring block $A_0$ adjacent to a bottom-left corner of the current block, a neighboring block $B_0$ adjacent to a top-right corner of the current block, and a neighboring block $B_2$ adjacent to a top-left corner of the current block. For example, let's assumed that a position of a top left corner sample of the current block is (0, 0), a width of the current block is W, and a height of the current block is H. The block $A_1$ may include a sample at position (−1, H−1). The block $B_1$ may include a sample at position (W−1, −1). The block $A_0$ may include a sample at position (−1, H). The block $B_0$ may include a sample at position (W, −1). The block $B_2$ may include a sample at position (−1, −1).

Expanding further an example of FIG. 10, a spatial merge candidate may be derived from a block adjacent to a top-left sample of a current block, or a block adjacent to a top-center sample of the current block. For example, the block neighboring to the top-left sample of the current block may include at least of a block including a sample at position (0, −1) or a block including a sample at position (−1, 0). Or, a spatial mere candidate may be derived from at least one of a block neighboring to a top-center sample of the current block or a block neighboring to a left-center sample of the current block. For example, the block neighboring to the top-center sample of the current block may include a sample at position (W/2, −1). The block neighboring to the left-center sample of the current block may include a sample at position (−1, H/2).

According to a shape of a current block, availability of an expanded spatial neighboring block may be determined. In an example, when a current block is a non-square block where a width is greater than a height, it may be determined that a block adjacent to a top-left sample of the current block, a block adjacent to a left-center sample, or a block adjacent to a bottom-left sample of the current block is not available. Meanwhile, when a current block is a block where a height is greater than a width, it may be determined that a block adjacent to a top-left sample of the current block, a block adjacent to a top-center sample, or a block adjacent to a top-right sample of the current block is not available.

Motion information of a spatial merge candidate may be set to be identical to motion information of a spatial neighboring block.

A spatial merge candidate may be determined by searching of neighboring blocks in a predetermined order. In an example, in an example shown in FIG. 10, searching for determining a spatial merge candidate may be performed in an order of blocks $A_1$, $B_1$, $B_0$, $A_0$, and $B_2$. Herein, a block $B_2$ may be used when at least one of remaining blocks (that is, $A_1$, $B_1$, $B_0$, and $A_0$) is not present or at least one is encoded through an intra-prediction mode.

An order of searching for a spatial merge candidate may be predefined in the encoder/decoder. Alternatively, an order of searching for a spatial merge candidate may be adaptively determined according to a size or shape of a current block. Alternatively, an order of searching for a spatial merge candidate may be determined on the basis of information signaled through a bitstream.

A temporal merge candidate may be derived from a temporal neighboring block of a current block S920. The temporal neighboring block may mean a co-located block included in a co-located picture. The co-located picture has a POC differing from a current picture including the current block. The co-located picture may be determined as a picture having a predefined index within a reference picture list or as a picture having a POC difference with the current picture being minimum. Alternatively, the co-located picture may be determined by information signaled through a bitstream. Information signaled through a bitstream may include at least one of information indicating a reference picture list (e.g., L0 reference picture list or L1 reference picture list) including the co-located picture and an index indicating the co-located picture within the reference picture list. Information for determining the co-located picture may be signaled in at least one of a picture parameter set, a slice header, and a block level.

Motion information on a temporal merge candidate may be determined on the basis of motion information a co-located block. In an example, a motion vector of a temporal merge candidate may be determined on the basis of a motion vector of a co-located block. For example, a motion vector of a temporal merge candidate may be set to be identical to a motion vector of a co-located block. Alternatively, a motion vector of a temporal merge candidate may be derived by scaling a motion vector of a co-located block on the basis of at least one of a POC difference between a current picture and a reference picture of the current block, and a POC difference between a co-located picture and a reference picture of the co-located.

Figure 11:
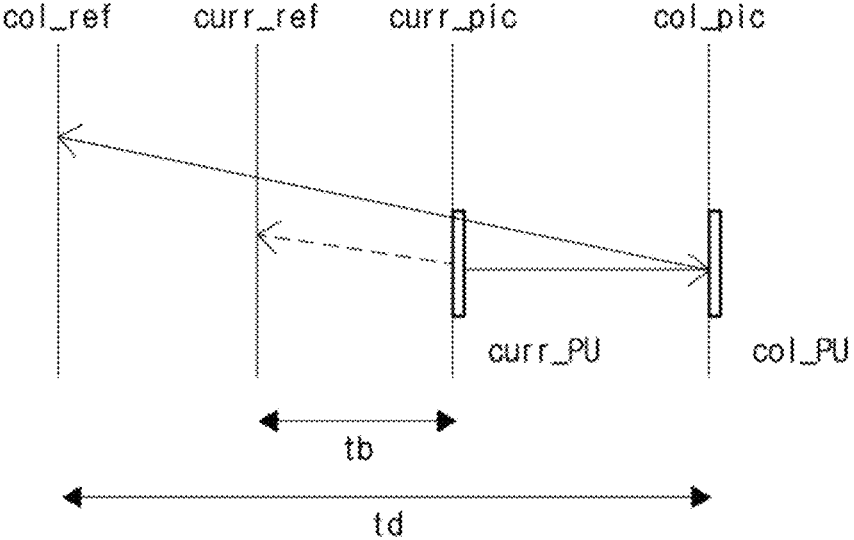
FIG. 11 is a diagram showing an example of deriving a motion vector of a temporal merge candidate.

FIG. 11 is a diagram showing an example of deriving a motion vector of a temporal merge candidate.

In an example shown in FIG. 11, tb represents a POC difference between a current picture curr_pic and a reference picture curr_ref of the current picture, and td represents a POC difference between a co-located picture col_pic and a reference picture col_ref of the co-located block. A motion vector of a temporal merge candidate may be derived by scaling a motion vector of the co-located block col_PU on the basis of tb and/or td.

Alternatively, taking into account of whether or not a co-located block is usable, a motion vector of the co-located block and a motion vector obtained by scaling the motion vector of the co-located block may be used as a motion vector of a temporal merge candidate. In an example, a motion vector of a co-located block is set as a motion vector of a first temporal merge candidate, and a value obtained by scaling the motion vector of the co-located block may be set as a motion vector of a second temporal merge candidate.

An inter-prediction direction of a temporal merge candidate may be set to be identical to an inter-prediction direction of a temporal neighboring block. However, a reference picture index of the temporal merge candidate may have a fixed value. In an example, a reference picture index of a temporal merge candidate may be set to "0". Alternatively, a reference picture index of a temporal merge candidate may be adaptively determined on the basis of at least one of a reference picture index of a spatial merge candidate, a reference picture index of a current picture.

A specific block having the same position and size with a current block within a co-located picture, or a block adjacent to a block adjacent to a block having the same position and size with the current block may be determined as a co-located block.

Figure 12:
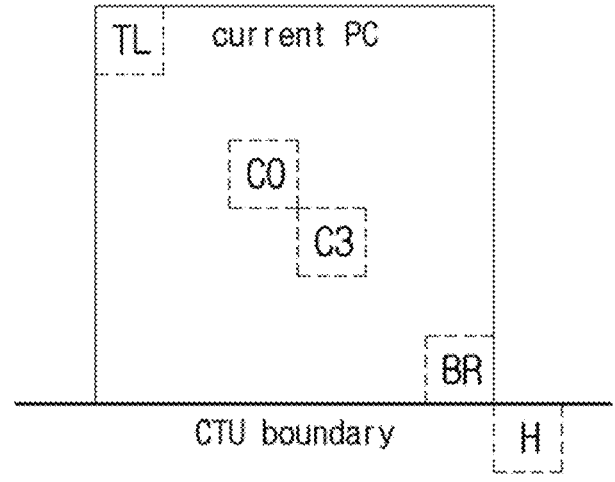
FIG. 12 is a diagram showing a position of candidate blocks that are possibly used as a co-located block.

FIG. 12 is a diagram showing a position of candidate blocks that are possibly used as a co-located block.

A candidate block may include at least one of a block adjacent to a position of a top-left corner of a current block within a co-located picture, a block adjacent to a position of a center sample of the current block within the co-located picture, and a block adjacent to a position of a bottom-left corner of the current block within the co-located picture.

In an example, a candidate block may include at least one of a block TL including a position of a top-left sample of a current block within a co-located picture, a block BR including a position of a bottom-right sample of the current block within the co-located picture, a block H adjacent to a bottom-right corner of the current block within the co-located picture, a block C3 including a position of a center sample of the current block within the co-located picture, and a block C0 adjacent to the center sample of the current block (for example, a block including a position of a sample spaced apart from the center sample of the current block by (−1, −1)) within the co-located picture.

In addition to the example shown in FIG. 12, a block including a position of a neighboring block adjacent to a predetermined boundary of a current block within the co-located picture may be selected as a co-located block.

The number of temporal merge candidates may be 1 or more. In an example, at least one temporal merge candidate may be derived on the basis of at least one co-located block.

Information on the maximum number of temporal merge candidates may be encoded and signaled through the encoder. Alternatively, the maximum number of temporal merge candidates may be derived on the basis of the maximum number of merge candidates and/or the maximum number of spatial merge candidates which are possible included in a merge candidate list. Alternatively, the maximum number of temporal merge candidates may be determined on the basis of the number of usable co-located blocks.

Whether or not candidate blocks are usable may be determined according to a predetermined priority, and at least one co-located block may be determined on the basis of the above determination and the maximum number of temporal merge candidates. In an example, when a block C3 including a position of a center sample of a current block and a block H adjacent to a bottom-right corner of the current block are candidate blocks, any one of the block C3 and the block H may be determined as a co-located block. When the block H is available, the block H may be determined as a co-located block. However, when the block H is not available (for example, when the block H is encoded through intra-prediction, when the block H is not usable or when the block H is positioned outside of the largest coding unit (LCU), etc.), a block C3 may be determined as a co-located block.

In another example, when at least one of a plurality of blocks adjacent to a bottom-right corner position of a current block within a co-located picture is unavailable (for example, a block H and/or a block BR), the unavailable block may be replaced with another available block. Another available block that is replaced with a unavailable block may include at least one a block (for example, C0 and/or C3) adjacent to a center sample position of a current block within a co-located picture, and a block (for example, TL) adjacent to a bottom-left corner of the current block with the co-located picture.

When at least one of a plurality of blocks adjacent to a center sample position of a current block within a co-located picture is unavailable or when at least one of a plurality of blocks adjacent to a top-left corner position of the current block within the co-located picture is unavailable, the unavailable block may be replaced with another available block.

Subsequently, a merge candidate list including the spatial merge candidate and the temporal merge candidate may be generated S930. When configuring a merge candidate list, a merge candidate having motion information identical with an existing merge candidate may be removed from the merge candidate list.

Information on the maximum number of merge candidates may be signaled through a bitstream. In an example, information indicating the maximum number of merge candidates may be signaled through a sequence parameter or picture parameter. In an example, when the maximum number of merge candidates is six, a total of six may be selected from spatial merge candidates and temporal merge candidates. For example, five spatial merge candidates may be selected from five merge candidates, and one temporal merge candidate may be selected from two temporal merge candidates.

Alternatively, the maximum number of merge candidates may be predefined in the encoder and the decoder. For example, the maximum number of merge candidates may be two, three, four, five, or six. Alternatively, the maximum number of merge candidates may be determined on the basis of at least one among whether merge with MVD (MMVD) is performed, whether mixed prediction is performed, and whether triangular partitioning is performed.

If the number of merge candidates included in a merge candidate list is smaller than the maximum number of merge candidates, a merge candidate included in a second merge candidate list may be added to the merge candidate list. A detailed description of the second merge candidate list will be described later.

When the number of merge candidates included a merge candidate list does not reach the maximum number of merge candidates yet, a combined merge candidate obtained by combining two or more merge candidates, or a merge candidate having a (0,0) motion vector (zero motion vector) is included in the merge candidate list.

Alternatively, an average merge candidate obtained by calculating an average motion vector of at least two merge candidates may be included in a merge candidate list. An average merge candidate may be derived by calculating an average motion vector of at least two merge candidates included in a merge candidate list. In an example, when a first merge candidate and a second merge candidate are added to a merge candidate list, an average of a motion vector of the first merge candidate and a motion vector of the second merge candidate may be calculated so as to obtain an average merge candidate. In detail, an L0 motion vector of an average merge candidate may be derived by calculating an average of an L0 motion vector of the first merge candidate and an L0 motion vector of the second merge candidate, and an L1 motion vector of the average merge candidate may be derived by calculating an average of an L1 motion vector of the first merge candidate and an L1 motion vector of the second merge candidate. When bi-directional prediction is applied to any one of a first merge candidate and a second merge candidate, and uni-directional prediction is performed to the other one, a motion vector of the bi-directional merge candidate may be set as it is to an L0 motion vector or L1 motion vector of an average merge candidate. In an example, when L0 directional and L1 directional predictions are performed on a first merge candidate, but L0 directional prediction is performed on a second merge candidate, an L0 motion vector of an average merge candidate may be derived by calculating an average of an L0 motion vector of the first merge candidate and an L0 motion vector of the second merge candidate. Meanwhile, an L1 motion vector of the average merge candidate may be derived as an L1 motion vector of the first merge candidate.

When a reference picture of a first merge candidate differs with a second merge candidate, a motion vector of the first merge candidate or second merge candidate may be scaled according to a distance (that is, POC difference) between reference pictures of respective merge candidates and a current picture. For example, after scaling a motion vector of a second merge candidate, an average merge candidate may be derived by calculating an average of a motion vector of a first merge candidate and the scaled motion vector of the second merge candidate. Herein, priorities may be set on the basis of a value of a reference picture index of each merge candidate, a distance between a reference picture of each merge candidate and a current block, or whether or not bi-directional prediction is applied, and scaling may be applied to a motion vector of a merge candidate having high (or low) priority.

A reference picture index of an average merge candidate may be set to indicate a reference picture at a specific position within a reference picture list. In an example, a reference picture index of an average merge candidate may indicate the first or last reference picture within a reference picture list. Alternatively, a reference picture index of an average merge candidate may be set to be identical to a reference picture index of a first merge candidate or second merge candidate. In an example, when a reference picture index of a first merge candidate is identical with a second merge candidate, a reference picture index of an average merge candidate may be set to be identical to a reference picture index of the first merge candidate and the second merge candidate. When a reference picture index of a first merge candidate differs with a second merge candidate, priorities may be set on the basis of a value of a reference picture index of each merge candidate, a distance between a reference picture of each merge candidate with the current block, or whether or not bi-directional prediction is applied, and a reference picture index of a merge candidate with high (or low) priority may be set as a reference picture index of an average merge candidate. In an example, when bi-directional prediction is applied to a first merge candidate, and uni-directional prediction is applied to a second merge candidate, a reference picture index of the first merge candidate to which bi-directional prediction is applied may be determined as a reference picture index of an average merge candidate.

On the basis of priorities between combinations of merge candidates, the sequence of the combinations for generating an average merge candidate may be determined. The priorities may be predefined in the encoder and the decoder. Alternatively, the sequence of the combinations may be determined on the basis of whether bi-directional prediction of a merge candidate is performed. For example, a combination of merge candidates encoded using bi-directional prediction may be set to have a higher priority that a combination of merge candidates encoded using uni-directional prediction. Alternatively, the sequence of the combinations may be determined on the basis of a reference picture of a merge candidate. For example, a combination of merge candidates having the same reference picture may have a higher priority than a combination of merge candidates having different reference pictures.

A merge candidate may be included in a merge candidate list according to predefined priority. A merge candidate with high priority may be assigned with a small index value. In an example, a spatial merge candidate may be added to a merge candidate list before than a temporal merge candidate. In addition, spatial merge candidates may be added to a merge candidate list in an order of a spatial merge candidate of a left neighboring block, a spatial merge candidate of a top neighboring block, a spatial merge candidate of a block adjacent to a top-right corner, a spatial merge candidate of a block adjacent to a bottom-left corner, and a spatial merge candidate of a block adjacent to a top-left corner. Alternatively, it may be set such that a spatial merge candidate derived from a neighboring block adjacent to a top-left corner of a current block (B2 of FIG. 10) is added to a merge candidate list later than a temporal merge candidate.

In another example, priorities between merge candidates may be determined according to a size or shape of a current block. In an example, when a current block has a rectangle shape where a width is greater than a height, a spatial merge candidate of a left neighboring block may be added to a merge candidate list before than a spatial merge candidate of a top neighboring block. On the other hand, when a current block has a rectangle shape where a height is greater than a width, a spatial merge candidate of a top neighboring block may be added to a merge candidate list before than a spatial merge candidate of a left neighboring block.

In another example, priorities between merge candidates may be determined according to motion information of respective merge candidates. In an example, a merge candidate having bi-directional motion information may have priority higher than a merge candidate having uni-directional motion information. Accordingly, a merge candidate having bi-directional motion information may be added to a merge candidate list before than a merge candidate having uni-directional motion information.

In another example, a merge candidate list may be generated according to predefined priority, and then merge candidates may be rearranged. Rearranging may be performed on the basis of motion information of merge candidates. In an example, rearranging may be performed on the basis of whether or not a merge candidate has bi-directional motion information, a size of a motion vector, precision of a motion vector, or a POC difference between a current picture and a reference picture of a merge candidate. In detail, a merge candidate having bi-directional motion information may be rearranged to have priority higher than a merge candidate having uni-directional motion information. Alternatively, a merge candidate having a motion vector with a precision value of a fractional-pel may be rearranged to have priority higher than a merge candidate having a motion vector with a precision of an integer-pel.

When the merge candidate list is generated, at least one of merge candidates included in the merge candidate list may be specified on the basis of a merge candidate index S940.

Motion information of the current block may be set to be identical to motion information of the merge candidate specified by the merge candidate index S950. In an example, when a spatial merge candidate is selected by the merge candidate index, motion information of the current block may be set to be identical to motion information of the spatial neighboring block. Alternatively, when a temporal merge candidate is selected by the merge candidate index, motion information of the current block may be set to be identical to motion information of the temporal neighboring block.

Information indicating whether to refine motion information of the current block derived from a merge candidate may be signaled through a bitstream. The information may be a one-bit flag. When the information indicates that the motion information of the current block is to be refined, information for determining a difference motion vector is further signaled.

The information for determining the difference motion vector may include information indicating the size of the difference motion vector, and information indicating the direction of the difference motion vector.

The information indicating the size of the difference motion vector may be index information that indicates any one of multiple candidates. For example, the index information may indicate any one of $\{1/4, 1/2, 1, 2, 4\}$. A candidate for the size of the difference motion vector may be determined on the basis of the precision (or resolution) of motion vector of the current block. For example, when the precision of the motion vector of the current block is a $1/4$ pel, candidates for the size of the difference motion vector are $\{1/4, 1/2, 1, 2, 4\}$. When the precision of the motion vector of the current block is a 1 pel, candidates for the size of the difference motion vector are $\{1, 2, 4, 8, 16\}$.

The information indicating the direction of the difference motion vector may be index information that indicates any one of multiple candidates. For example, the index information may indicate any one of $\{(+,0), (-,0), (0,+), (0,-)\}$. The sign + denotes a positive direction with respect to the x axis or the y axis, and the sign − denotes a negative direction with respect to the x axis or the y axis. The numeral 0 indicates that the x-axis or y-axis displacement is zero. A combination of directions in which both the x-axis and the y-axis displacement are not zero may be used. For example, candidates of $\{(+,+), (+,-), (-,+), (-,-)\}$ may be used.

By adding the difference motion vector to the motion vector of the current block derived from the merge candidate, a new motion vector (for example, a refined motion vector) of the current block may be acquired. On the basis of the new motion vector of the current block, motion compensation for the current block may be performed.

When it is determined to refine the motion vector of the current block derived from the merge candidate, the maximum number of merge candidates is limited to a predefined number. For example, the predefined number may be two.

Figure 13:
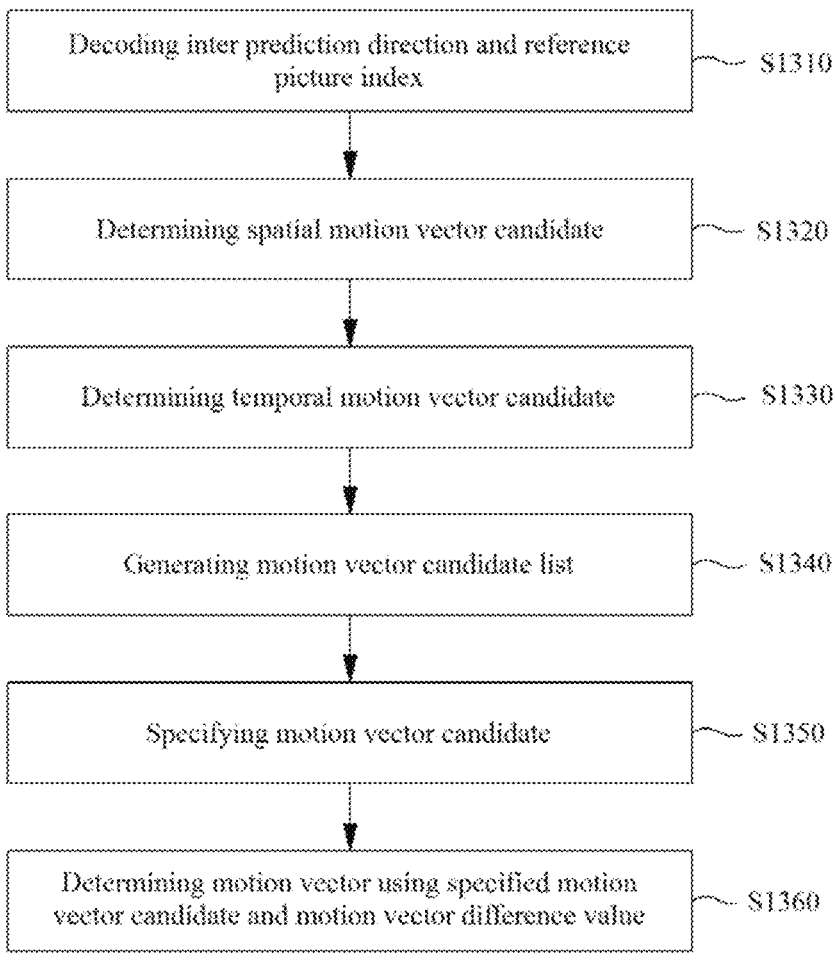
FIG. 13 is a diagram showing a process of deriving motion information of a current block when an AMVP mode is applied to the current block.

FIG. 13 is a diagram showing a process of deriving motion information of a current block when an AMVP mode is applied to the current block.

When an AMVP mode is applied to a current block, at least one of an inter-prediction direction of the current block, and a reference picture index may be decoded from a bitstream S1310. In other words, when an AMVP mode is applied, at least one of an inter-prediction direction of the current block, and a reference picture index may be determined on the basis of information encoded through a bitstream.

A spatial motion vector candidate may be determined on the basis of a motion vector of a spatial neighboring block of the current block S1320. The spatial motion vector candidate may include at least one of a first spatial motion vector candidate derived from a top neighboring block of the current block, and a second spatial motion vector candidate derived from a left neighboring block of the current block. Herein, the top neighboring block may include at least one of blocks adjacent to a top and a top-right corner of the current block, and the left neighboring block of the current block includes at least one of blocks adjacent to a left and a left-bottom corner of the current block. The block adjacent to the left-top corner of the current block may be used as the top neighboring block or may be used as the left neighboring block.

Alternatively, a spatial motion vector candidate may be derived from a spatial non-neighboring block that is not adjacent to a current block. In an example, a spatial motion vector candidate of a current block may be derived by using at least one of: a block positioned at the same vertical line with a block adjacent to a top, top-right corner, or top-left corner of the current block; a block positioned at the same horizontal line with a block adjacent to a left, bottom-left corner, or top-left corner of the current block; and a block positioned at the same diagonal line with a block adjacent to a corner of the current block. When a spatial neighboring block is not available, a spatial motion vector candidate may be derived by using a spatial non-neighboring block.

In another example, at least two spatial motion vector candidates may be derived by using a spatial neighboring block and spatial non-neighboring blocks. In an example, a first spatial motion vector candidate and a second spatial motion vector candidate may be derived by using neighboring blocks adjacent to a current block. Meanwhile, a third spatial motion vector candidate and/or a fourth spatial motion vector candidate may be derived on the basis of blocks that are not adjacent to the current block but adjacent to the above neighboring blocks.

When the current block differs in a reference picture with the spatial neighboring block, a spatial motion vector may be obtained by performing scaling for a motion vector of the spatial neighboring block. A temporal motion vector candidate may be determined on the basis of a motion vector of the temporal neighboring block of the current block S1330. When the current block differs in a reference picture with the temporal neighboring block, a temporal motion vector may be obtained by performing scaling on a motion vector of the temporal neighboring block. Herein, when the number of spatial motion vector candidates is equal to or smaller than a predetermined number, a temporal motion vector candidate may be derived.

A motion vector candidate list including the spatial motion vector candidate and the temporal motion vector candidate may be generated S1340.

When the motion vector candidate list is generated, at least one of motion vector candidates included in the motion vector candidate list may be specified on the basis of information specifying at least one of the motion vector candidate list S1350.

The motion vector candidate specified by the information may be set as a prediction value of a motion vector of the current block, and the motion vector of the current block may be obtained by adding a residual value of a motion vector to the prediction value of the motion vector S1360. Herein, the residual value of the motion vector may be parsed through a bitstream.

When the motion information of the current block is obtained, motion compensation for the current block may be performed on the basis of the obtained motion information S820. In detail, motion compensation for the current block may be performed on the basis of an inter-prediction direction, a reference picture index, and a motion vector of the current block.

When a prediction sample is obtained by performing motion compensation, the current block may be reconstructed on the basis of the generated prediction sample. In detail, a reconstructed sample may be obtained by adding a prediction sample of a current block and a residual sample.

As in the above-described example, on the basis of motion information of the block encode/decoded using inter prediction before the current block, a merge candidate of the current block may be derived. For example, on the basis of motion information of a neighboring block at a predefined position adjacent to the current block, a merge candidate of the current block may be derived. Examples of the neighboring block may include at least one among a block adjacent to the left side of the current block, a block adjacent to the top of the current block, a block adjacent to the top left corner of the current block, a block adjacent to the top right corner of the current block, and a block adjacent to the bottom left corner of the current block.

A merge candidate of the current block may be derived on the basis of motion information of a block other than the neighboring block. For convenience of description, a neighboring block at a predefined position adjacent to the current block is referred to as a first merge candidate block, and a block at a different position from the first merge candidate block is referred to as a second merge candidate block.

Examples of the second merge candidate block may include at least one among a block encode/decoded using inter prediction before current block, a block adjacent to the first merge candidate block, and a block positioned on the same line as the first merge candidate block. Blocks positioned on the same line as the first merge candidate block may include at least one among a block positioned on the same horizontal line as the first merge candidate block, a block positioned on the same vertical line as the first merge candidate block, and a block positioned on the same diagonal line as the first merge candidate block. The y-coordinate positions of the respective blocks positioned on the same horizontal line are the same. The x-coordinate positions of the respective blocks positioned on the same vertical line are the same. A difference value between the x-coordinate positions of the respective blocks positioned on the same diagonal line is the same as a difference value between the y-coordinate positions.

When the first merge candidate block is unavailable, a merge candidate derived on the basis of motion information of the second merge candidate block is added to a merge candidate list. Alternatively, even though at least one among a spatial merge candidate and a temporal merge candidate is added to a merge candidate list, when the number of merge candidates included in the merge candidate list is smaller than the maximum number of merge candidates, a merge candidate derived on the basis of motion information of the second merge candidate block is added to the merge candidate list.

Figure 14:
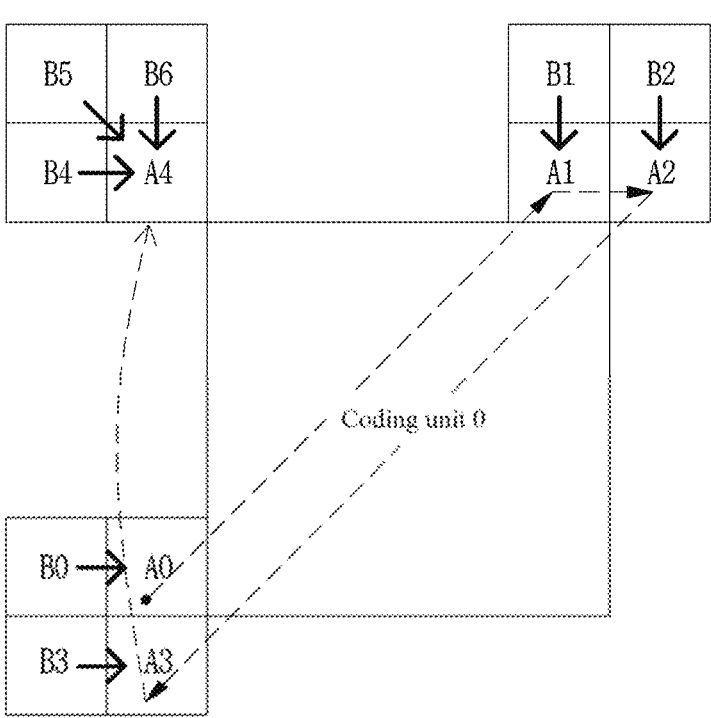
FIG. 14 is a diagram illustrating an example of deriving a merge candidate from a second merge candidate block when a first merge candidate block is unavailable.
Figure 15:
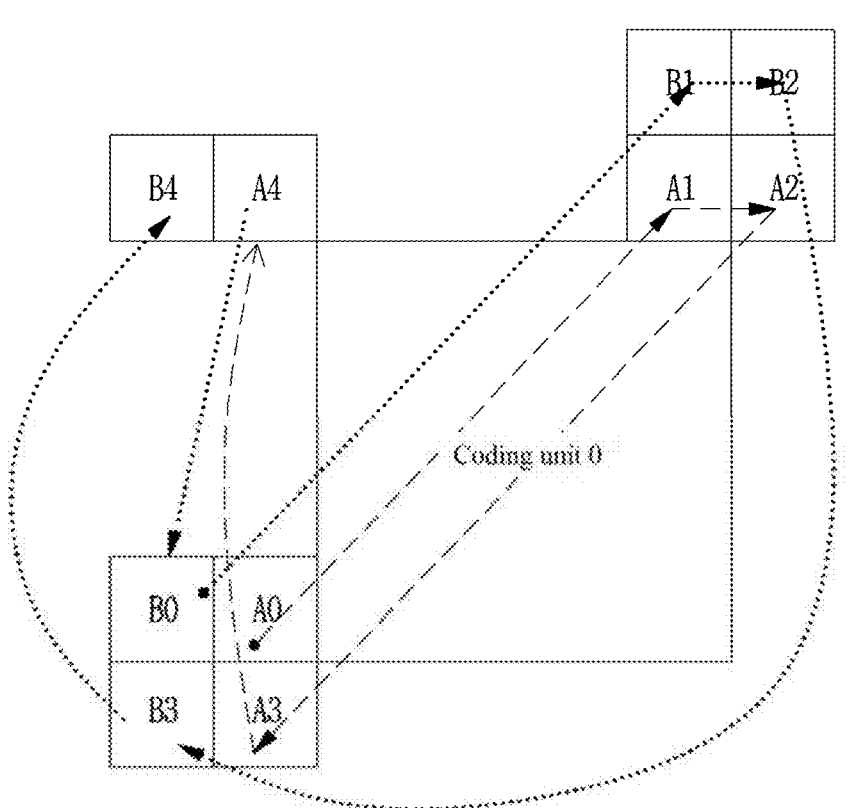
FIGS. 15 to 18 are diagrams illustrating the order of searching for merge candidate blocks.
Figure 16:
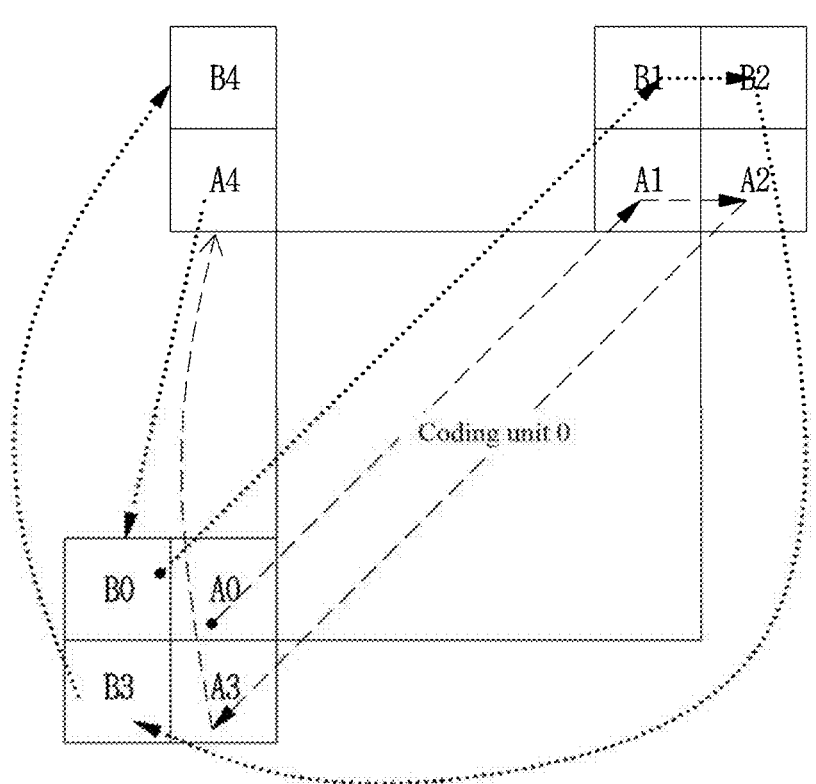
Figure 17:
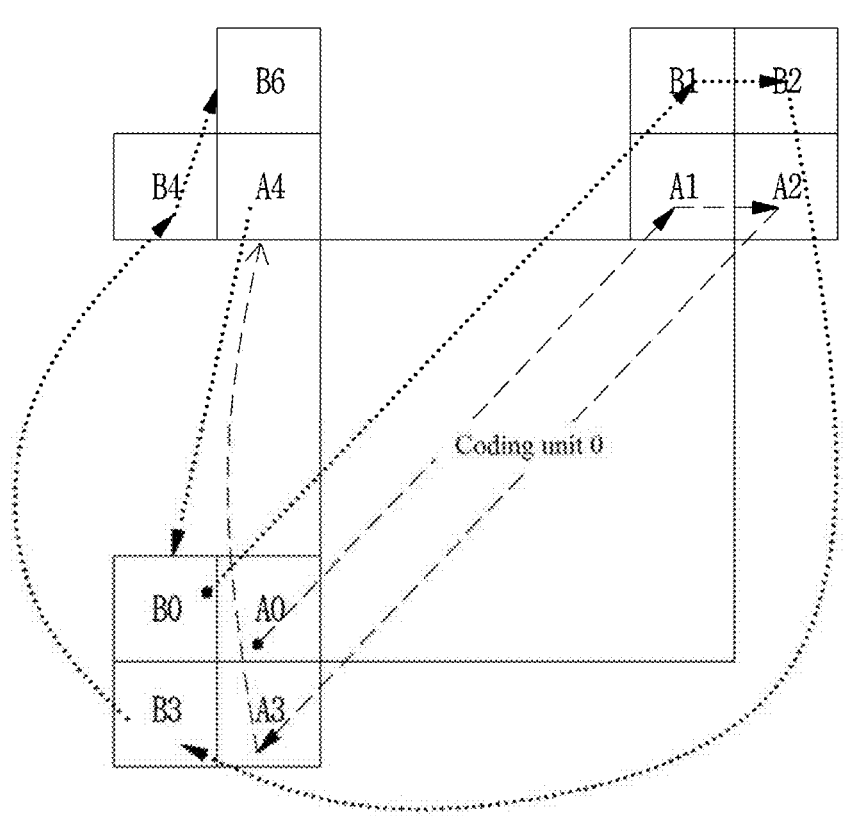
Figure 18:
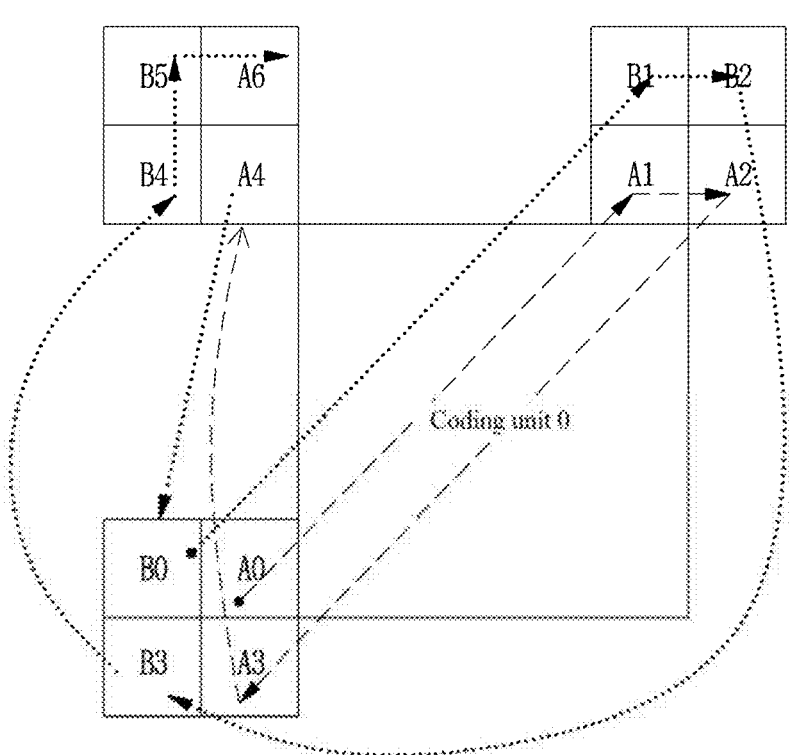

FIG. 14 is a diagram illustrating an example of deriving a merge candidate from a second merge candidate block when a first merge candidate block is unavailable.

When a first merge candidate block AN (herein, N ranges from zero to four) is unavailable, a merge candidate of the current block is derived on the basis of motion information of a second merge candidate block BM (herein, M ranges from zero to six). That is, a merge candidate of the current block may be derived by replacing the unavailable first merge candidate block with the second merge candidate block.

Among the blocks adjacent to the first merge candidate block, the block placed in a predefined direction from the first merge candidate block may be set as a second merge candidate block. The predefined direction may be a leftward direction, a rightward direction, an upward direction, a downward direction, or a diagonal direction. The predefine direction may be set for each first merge candidate block. For example, a predefined direction of the first merge candidate block adjacent to the left side of the current block may be a leftward direction. A predefined direction of the first merge candidate block adjacent to the top of the current block may be an upward direction. A predefined direction of the first merge candidate block adjacent to the corner of the current block may include at least one among a leftward direction, an upward direction, and a diagonal direction.

For example, when A0 adjacent to the left side of the current block is unavailable, a merge candidate of the current block is derived on the basis of B0 adjacent to A1. When A1 adjacent to the top of the current block is unavailable, a merge candidate of the current block is derived on the basis of B1 adjacent to A1. When A2 adjacent to the top right corner of the current block is unavailable, a merge candidate of the current block is derived on the basis of B2 adjacent to A2. When A3 adjacent to the bottom left corner of the current block is unavailable, a merge candidate of the current block is derived on the basis of B3 adjacent to A3. When A4 adjacent to the top left corner of the current block is unavailable, a merge candidate of the current block is derived on the basis of at least one among B4 to B6 adjacent to A4.

The example shown in FIG. 14 is only for describing an embodiment of the present invention, and does not limit the present invention. A position of the second merge candidate block may be set different from the sample shown in FIG. 14. For example, the second merge candidate block adjacent to the first merge candidate block adjacent to the left side of the current block may be positioned in an upward direction or downward direction of the first merge candidate block. Alternatively, the second merge candidate block adjacent to the first merge candidate block adjacent to the top of the current block may be positioned in a leftward direction or rightward direction of the first merge candidate block.

The first merge candidate list and the second merge candidate list may be constructed, and motion compensation of the current block may be performed on the basis of at least one among the first merge candidate list and the second merge candidate list.

The first merge candidate list may include at least one among a spatial merge candidate derived on the basis of motion information of a neighboring block at a predefined position adjacent to the current block, and a temporal merge candidate derived on the basis of motion information of a co-located block.

The second merge candidate list may include a merge candidate derived on the basis of the motion information of the second merge candidate block.

As an embodiment of the present invention, the first merge candidate list may be constructed including a merge candidate derived from the first merge candidate block, and the second merge candidate list may be constructed including a merge candidate derived from the second merge candidate block. For example, in the example shown in FIG. 14, merge candidates derived from blocks A0 to A4 may be added to the first merge candidate list, and merge candidates derived from blocks B0 to B6 may be added to the second merge candidate list.

Alternatively, the second merge candidate list may include a merge candidate derived on the basis of motion information of a block that is encoded/decoded using inter prediction before the current block.

The second merge candidate list may be initialized on a per-CTU basis, a per-tile basis, or a per-slice basis. The maximum number of merge candidates that the second merge candidate list is able to include may be predefined in the encoder and the decoder. Alternatively, information indicating the maximum number of merge candidates that the second merge candidate list is able to include may be signaled through a bitstream.

The second merge candidate list may include a merge candidate derived on the basis of motion information of a block that is encoded/decoded using inter prediction before the current block. For example, when motion compensation for a block of which an encoding mode is inter prediction is performed, a merge candidate derived on the basis of motion information of the block is added to the second merge candidate list. When encoding/decoding of the current block is completed, motion information of the current block is added to the second merge candidate list for inter prediction of the subsequent block.

Indexes of the merge candidates included in the second merge candidate list may be determined on the basis of the order in which the merge candidates are added to the second merge candidate list. For example, an index allocated to the N-th merge candidate added to the second merge candidate list may have a lower value than an index allocated to the N+1-th merge candidate added to the second merge candidate list. For example, an index of the N+1-th merge candidate may be set to have a higher value by one than an index of the N-th merge candidate. Alternatively, an index of the N-th merge candidate may be set to an index of the N+1-th merge candidate, and a value of the index of the N-th merge candidate subtract is decreased by one.

Alternatively, an index allocated to the N-th merge candidate added to the second merge candidate list may have a higher value than an index allocated to the N+1-th merge candidate added to the second merge candidate list. For example, an index of the N-th merge candidate may be set to an index of the N+1-th merge candidate, and a value of the index of the N-th merge candidate subtract is increased by one.

On the basis of whether motion information of a block subjected to motion compensation is the same as motion information of the merge candidate included in the second merge candidate list, it may be determined whether to add a merge candidate derived from the block to the second merge candidate list. For example, when the merge candidate having the same motion information as the block is included in the second merge candidate list, a merge candidate derived on the basis of the motion information of the block is not added to the second merge candidate list. Alternatively, when the merge candidate having the same motion information as the block is included in the second merge candidate list, the merge candidate is deleted from the second merge candidate list and a merge candidate derived on the basis of the motion information of the block is added to the second merge candidate list.

When the number of merge candidates included in the second merge candidate list is the same as the maximum number of merge candidates, the merge candidate having the lowest index or the merge candidate having the highest index is detected from the second merge candidate list and a merge candidate derived on the basis of the motion information of the block is added to the second merge candidate list. That is, after deleting the oldest merge candidate among the merge candidates included in the second merge candidate list, a merge candidate derived on the basis of the motion information of the block may be added to the second merge candidate list.

Either the first merge candidate list or the second merge candidate list may be selected, and inter prediction of the current block may be performed using the selected merge candidate list. Specifically, on the basis of index information, any one of the merge candidates included in the selected merge candidate list may be selected, and motion information of the current block may be acquired from the selected merge candidate.

Information specifying either the first merge candidate list or the second merge candidate list may be signaled through a bitstream. The decoder may select either the first merge candidate list or the second merge candidate list on the basis of the information.

Alternatively, among the first merge candidate list and second merge candidate list, the merge candidate list including a larger number of available merge candidates may be selected.

Alternatively, either the first merge candidate list or the second merge candidate list may be selected on the basis of at least one among the size, the shape, and the partition depth of the current block.

Alternatively, to any one among the first merge candidate list and the second merge candidate list, the other may be added (or appended).

For example, inter prediction may be performed on the basis of a merge candidate list including at least one merge candidate included in the first merge candidate list, and at least one merge candidate included in the second merge candidate list.

For example, a merge candidate included in the second merge candidate list may be added to the first merge candidate list. Alternatively, a merge candidate included in the first merge candidate list may be added to the second merge candidate.

When the number of merge candidates included in the first merge candidate list is smaller than the maximum number, or when the first merge candidate block is unavailable, a merge candidate included in the second merge candidate list is added to the first merge candidate list.

Alternatively, when the first merge candidate block is unavailable, the merge candidate derived from a block adjacent to the first merge candidate block among the merge candidates included in the second merge candidate list is added to the first merge candidate list. Referring to FIG. 14, when A0 is unavailable, a merge candidate derived on the basis of motion information of B0 among the merge candidates included in the second merge candidate list is added to the first merge candidate list. When A1 is unavailable, a merge candidate derived on the basis of motion information of B1 among the merge candidates included in the second merge candidate list is added to the first merge candidate list. When A2 is unavailable, a merge candidate derived on the basis of motion information of B2 among the merge candidates included in the second merge candidate list is added to the first merge candidate list. When A3 is unavailable, a merge candidate derived on the basis of motion information of B3 among the merge candidates included in the second merge candidate list is added to the first merge candidate list. When A4 is unavailable, a merge candidate derived on the basis of motion information of B4, B5, or B6 among the merge candidates included in the second merge candidate list is added to the first merge candidate list.

Alternatively, a merge candidate to be added to the first merge candidate list may be determined according to the priorities of the merge candidates included in the second merge candidate list. The priorities may be determined on the basis of an index value. For example, when the number of merge candidates included in the first merge candidate list is smaller than the maximum number, or when the first merge candidate block is unavailable, the merge candidate having the lowest index value or the merge candidate having the highest index value among the merge candidates included in the second merge candidate list is added to the first merge candidate list.

When a merge candidate having the same motion information as a merge candidate included in the second merge candidate list is included in the first merge candidate list, a merge candidate to which an index value higher than the index value by one is allocated or a merge candidate to which an index value lower than the index value by one is allocated is added to the first merge candidate list.

A merge candidate list including a merge candidate derived on the basis of motion information of the first merge candidate block, and a merge candidate derived on the basis of motion information of the second merge candidate block may be generated. The merge candidate list may be a combination of the first merge candidate list and the second merge candidate list.

For example, according to a predetermined order of searching, a merge candidate list may be generated by searching for the first merge candidate block and the second merge candidate block.

FIGS. 15 to 18 are diagrams illustrating the order of searching for merge candidate blocks.

FIGS. 15 to 18 shows the order of searching for merge candidates as follows.

A0→A1→A2→A3→A4→B0→B1→B2→B3→B4→
(B5)→(B6)

Only when a block B4 is unavailable or when the number of merge candidates included in the merge candidate list is equal to or smaller than a preset number, searching for blocks B5 and B6 takes place.

The different order of searching from the examples shown in FIGS. 15 to 18 may be set.

A combined merge candidate list including at least one merge candidate included in the first merge candidate list, and at least one merge candidate included in the second merge candidate list may be generated. For example, the combined merge candidate list may include N of merge candidates included in the first merge candidate list, and M of merge candidates included in the second merge candidate list. The letters N and M may denote the same number or different numbers. Alternatively, at least one among N and M may be determined on the basis of at least one among the number of merge candidates included in the first merge candidate list and the number of merge candidates included in the second merge candidate list. Alternatively, information for determining at least one among N and M may be signaled through a bitstream. Any one among N and M may be derived by subtracting the other from the maximum number of merge candidates in the combined merge candidate list.

Merge candidates to be added to the combined merge candidate list may be determined according to a predefined priority. The predefined priority may be determined on the basis of indexes allocated to the merge candidates.

Alternatively, a merge candidate to be added to the combined merge candidate list may be determined on the basis of association between merge candidates. For example, when A0 included in the first merge candidate list is added to the combined merge candidate list, a merge candidate (for example, B0) at a position adjacent to A0 is not added to a combined merge list.

When the number of the merge candidates included in the first merge candidate list is smaller than N, more than M merge candidates among the merge candidates included in the second merge candidate list are added to the combined merge candidate list. For example, when N is four and M is two, four of the merge candidates included in the first merge candidate list are added to the combined merge candidate list, and two of the merge candidates included in the second merge candidate list are added to the combined merge candidate list. When the number of the merge candidates included in the first merge candidate list is smaller than four, two or more merge candidates among the merge candidates included in the second merge candidate list are added to the combined merge candidate list. When the number of the merge candidates included in the second merge candidate list is smaller than two, four or more of the merge candidates included in the first merge candidate list are added to the combined merge candidate list.

That is, the value of N or M may be adjusted according to the number of merge candidates included in each merge candidate list. By adjusting the value of N or M, the total number of merge candidates included in the combined merge candidate list may be fixed. When the total number of merge candidates included in the combined merge candidate list is smaller than the maximum number of merge candidates, a combined merge candidate, an average merge candidate, or a zero motion vector candidate is added.

A merge candidate may be derived on the basis of a block having a predetermined shape or a predetermined size or larger. When the current block is not in a predetermined shape, or when the size of the current block is smaller than a predetermined size, a merge candidate of the current block is derived on the basis of a block including the current block and being in the a predetermined shape or in the predetermined size or larger. The predetermined shape may be a square shape or a non-square shape.

When the predetermined shape is a square shape, a merge candidate for a coding unit in a non-square shape is derived on the basis of a coding unit in a square shape including the coding unit in the non-square shape.

Figure 19:
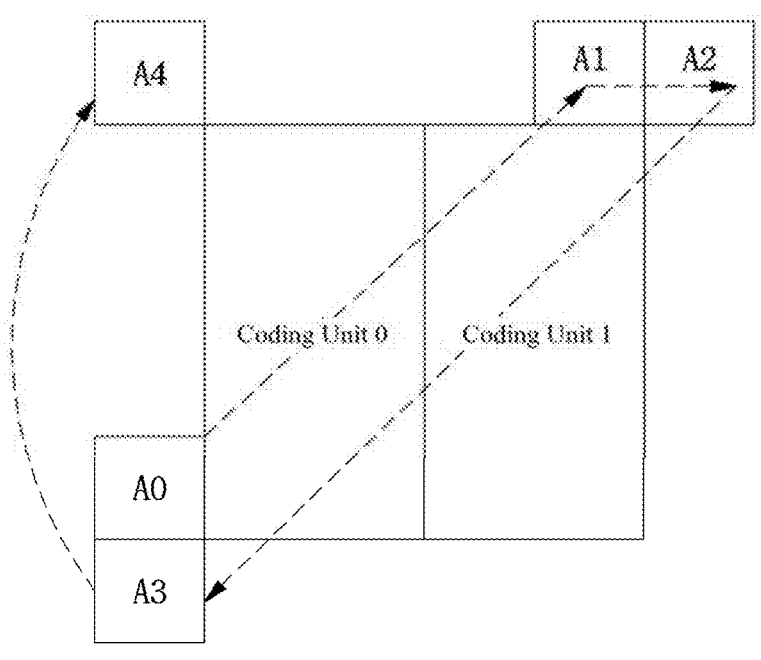
FIG. 19 is a diagram illustrating an example in which a merge candidate of a non-square block is derived on the basis of a square block.
Figure 19:
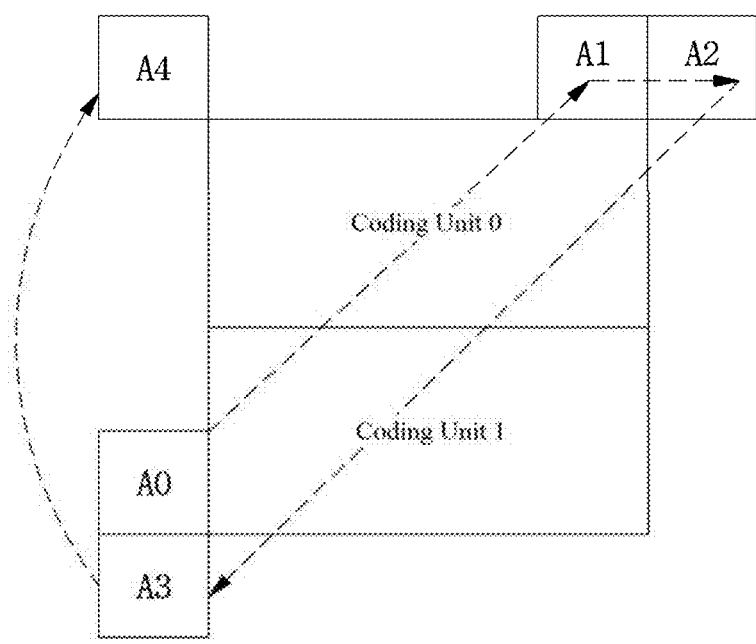

FIG. 19 is a diagram illustrating an example in which a merge candidate of a non-square block is derived on the basis of a square block.

A merge candidate of a non-square block may be derived on the basis of a square block including the non-square block. For example, a merge candidate of a coding block 0 in a non-square shape and a coding block 1 in a non-square shape may be derived on the basis of a block in a square shape including the coding block 0 and the coding block 1. That is, a position of a spatial neighboring block may be determined on the basis of a position, a width/height, or a size of a block in a square shape. A merge candidate of a coding block 0 and a coding block 1 may be derived on the basis of at least one among spatial neighboring blocks A0, A1, A2, A3, and A4 adjacent to a block in a square shape.

A temporal merge candidate may be determined on the basis of a block in a square shape. That is, a temporal neighboring block may be determined on the basis of a position, a width/height, or a size of a block in a square shape. For example, a merge candidate of a coding block 0 and a coding block 1 may be derived on the basis of the temporal neighboring block determined on the basis of the block in the square shape.

Alternatively, any one among a spatial merge candidate and a temporal merge candidate may be derived on the basis of a square block, and the other merge candidate may be derived on the basis of a non-square block. For example, a spatial merge candidate of a coding block 0 may be derived on the basis of a square block, while a temporal merge candidate of the coding block 0 may be derived on the basis of the coding block 0.

Multiple blocks included in a block in a predetermined shape or a predetermined size or larger may share a merge candidate. For example, in the example shown in FIG. 19, at least one among a spatial merge candidate and a temporal merge candidate of a coding block 0 and a coding block 1 may be the same.

The predetermined shape may be a non-square shape, such as 2N×N, N×2N, or the like. When the predetermined shape is a non-square shape, a merge candidate of the current block may be derived on the basis of a non-square block including the current block. For example, when the current block is in a 2N×n shape (herein, n is ½N), a merge candidate of the current block is derived on the basis of a non-square block in a 2N×N shape. Alternatively, when the current block is in a n×2N shape, a merge candidate of the current block is derived on the basis of a non-square block in an N×2N shape.

Information indicating a predetermined shape or a predetermined size may be signaled through a bitstream. For example, information indicating any one among a non-square shape or a square shape may be signaled through a bitstream.

Alternatively, a predetermined shape or a predetermined size may be determined according to a rule predefined in the encoder and the decoder.

When a child node does not satisfy a predetermined condition, a merge candidate of the child node is derived on the basis of a parent node satisfying the predetermined condition. Herein, the predetermined condition may include at least one among whether the block is a block generated as a result of quad tree partitioning, whether exceeding the size of the block, the shape of the block, and the picture boundary takes place, and whether the difference in depth between the child node and the parent node is equal to or greater than a predetermined value.

For example, predetermined conditions may include whether the block is a block generated as a result of quad tree partitioning, and whether the block is a square shape coding block in a predetermined size or larger. When the current block is generated by binary tree partitioning or triple tree partitioning, a merge candidate of the current block is derived on the basis of a high-level node block that includes the current block and satisfies the predetermined conditions. When there is no high-level node block satisfying the predetermined conditions, a merge candidate of a current block is derived on the basis of the current block, a block that includes the current block and is in a predetermined size or larger, or a high-level node block that includes the current block and has the depth difference of one with the current block.

Figure 20:
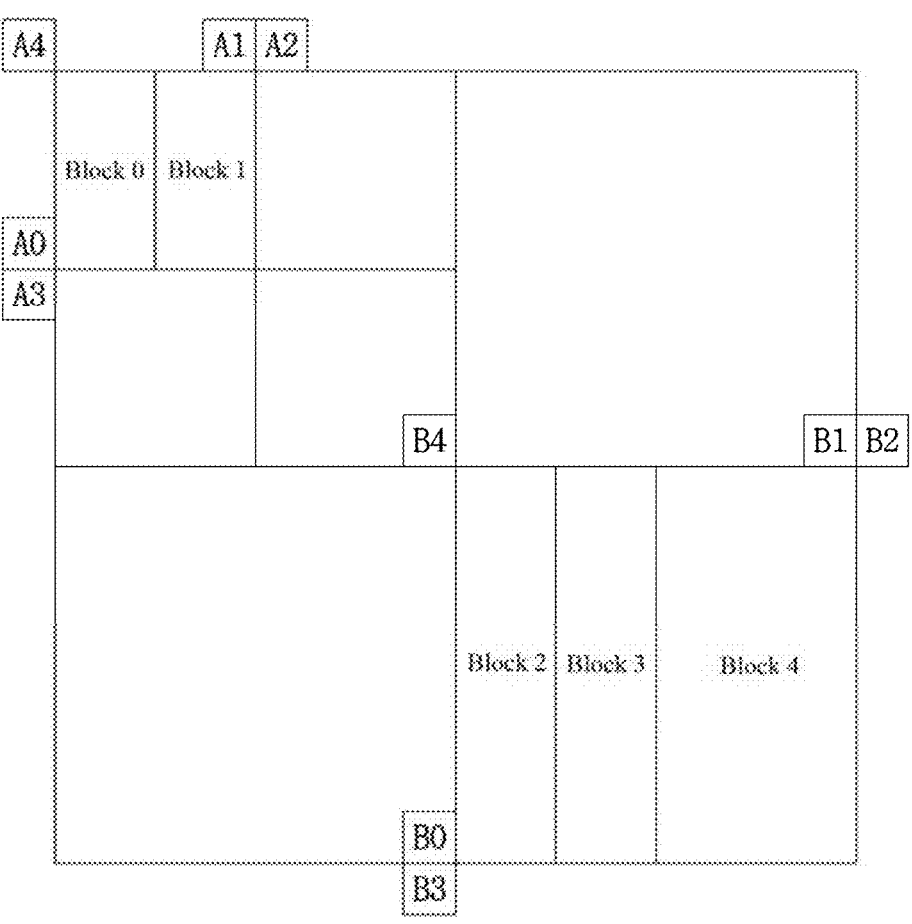
FIG. 20 is a diagram illustrating an example of deriving a merge candidate on the basis of a high-level node block.

FIG. 20 is a diagram illustrating an example of deriving a merge candidate on the basis of a high-level node block.

A block 0 and a block 1 are generated by partitioning a square block on the basis of a binary tree. A merge candidate of the block 0 and the block 1 may be derived on the basis of a neighboring block (that is, at least one among A0, A1, A2, A3, and A4) that is determined on the basis of a high-level node block including the block 0 and the block 1. As a result of this, the block 0 and the block 1 may use the same spatial merge candidate.

A high-level node block including a block 2 and a block 3, and a block 4 may be generated by partitioning a square block on the basis of a binary tree. In addition, the block 2 and the block 3 may be generated by partitioning a block in a non-square shape on the basis of a binary tree. A merge candidate of the block 2, the block 3, and the block 4 in non-square shapes may be derived on the basis of a high-level node block including the same. That is, a merge candidate may be derived on the basis of a neighboring block (for example, at least one among B0, B1, B2, B3, and B4) that is determined on the basis of a position, a width/height, or a size of a square block including the block 2, the block 3, and the block 4. As a result of this, the block 2, the block 3, and the block 4 may use the same spatial merge candidate.

A temporal merge candidate for a block in a non-square shape may be derived on the basis of a high-level node block. For example, a temporal merge candidate for the block 0 and the block 1 may be derived on the basis of a square block including the block 0 and the block 1. A temporal merge candidate for the block 2, the block 3, and the block 4 may be derived on the basis of a square block including the block 2, the block 3, and the block 4. In addition, the same temporal merge candidate derived from a temporal neighboring block determined on a per-quad tree block basis may be used.

Low-level node blocks included in a high-level node block may share at least one among a spatial merge candidate and a temporal merge candidate. For example, the low-level node blocks included in the high-level node block may use the same merge candidate list.

Alternatively, at least one among a spatial merge candidate and a temporal merge candidate may be derived on the basis of a low-level node block, and the other may be derived on the basis of a high-level node block. For example, a spatial merge candidate for the block 0 and the block 1 may be derived on the basis of the high-level node block. However, a temporal merge candidate for the block 0 may be derived on the basis of the block 0, and a temporal merge candidate for the block 1 may be derived on the basis of the block 1.

Alternatively, when the number of samples that a low-level node block includes is smaller than a predefined number, a merge candidate is derived on the basis of a high-level node block including the predefined number or more of samples. For example, when at least one of the following conditions is satisfied: a case where at least one of low-level node blocks generated on the basis of at least one among quad tree partitioning, binary tree partitioning, and triple tree partitioning is smaller than a preset size; a case where at least one of the low-level node blocks is a non-square block; a case where a high-level node block does not exceed a picture boundary; and a case where a width or height of a high-level node block is equal to or greater than a predefined value, a merge candidate is derived on the basis of a high-level node block in a square or non-square shape including a predefined number of more of samples (for example, 64, 128, or 256 samples). The low-level node blocks included in the high-level node block may share merge candidates derived on the basis of the high-level node block.

A merge candidate may be derived on the basis of any one of low-level node block, and the other low-level node blocks may be set to use the merge candidate. The low-level node blocks may be included in a block in a predetermined shape or a predetermined size or larger. For example, low-level node blocks may share a merge candidate list derived on the basis of any one of the low-level node blocks. Information for a low-level node block that is the basis of derivation of the merge candidate may be signaled through a bitstream. The information may be index information indicating any one of low-level node blocks. Alternatively, the low-level node block that is the basis of derivation of the merge candidate may be determined on the basis of at least one among positions, sizes, shapes, and the scanning order of the low-level node blocks.

Information indicating whether low-level node blocks share a merge candidate list derived on the basis of a high-level node block may be signaled through a bitstream. On the basis of the information, it may be determined whether a merge candidate of a block not in a predetermined shape or a block in a size smaller than a predetermined size is derived on the basis of a high-level node block including the block. Alternatively, according to a rule predefined in the encoder and the decoder, it may be determined whether a merge candidate is derived on the basis of a high-level node block.

When a neighboring block adjacent to the current block is present within a predefined region, it is determined that the neighboring block is unavailable as a spatial merge candidate. The predefined region may be a parallel-processing region defined for parallel processing between blocks. The parallel-processing region may be referred to as a merge estimation region (MER). For example, when a neighboring block adjacent to the current block is included in the same merge estimation region as the current block, it is determined that the neighboring block is unavailable. A shift operation may be performed so as to determine whether the current block and the neighboring block are included in the same merge estimation region. Specifically, on the basis of whether a value obtained by shifting the position of the top left reference sample of the current block is the same as a value obtained by shifting the position of the top left reference sample of the neighboring block, it may be determined whether the current block and the neighboring block are included in the same merge estimation region.

Figure 21:
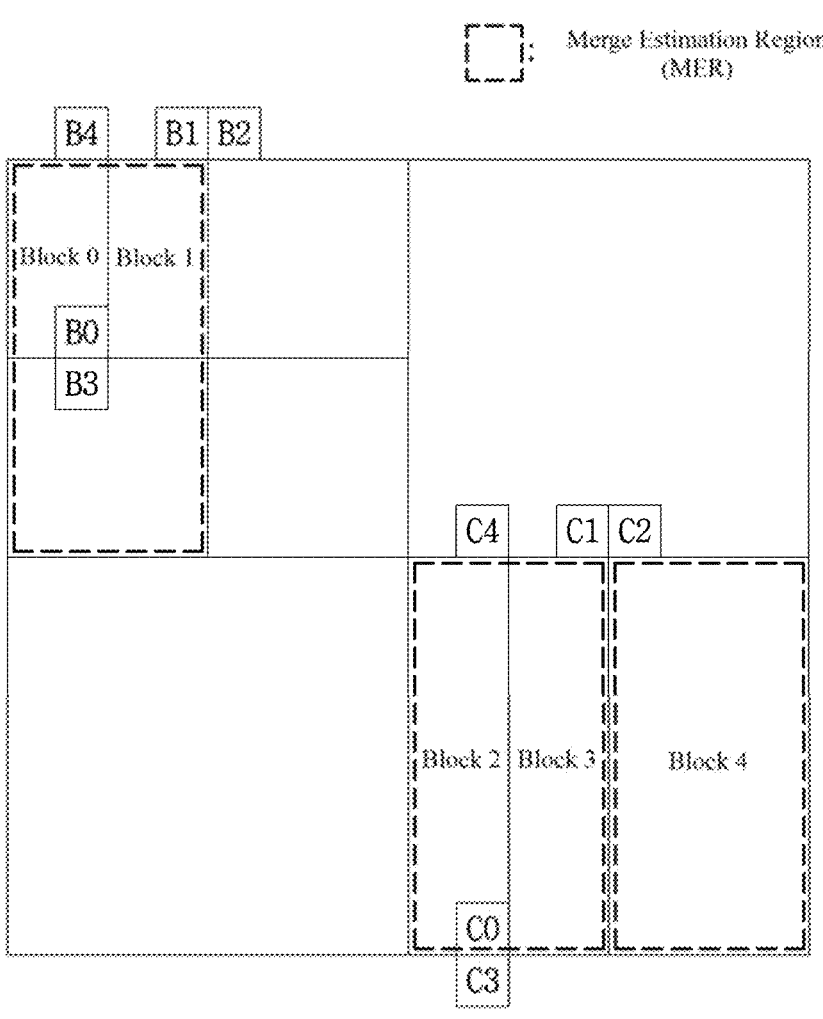
FIG. 21 is a diagram illustrating an example of determining availability of a spatial neighboring block on the basis of a merge estimation region.

FIG. 21 is a diagram illustrating an example of determining availability of a spatial neighboring block on the basis of a merge estimation region.

In FIG. 21, it is shown that a merge estimation region is in an N×2N shape.

A merge candidate of a block 1 may be derived on the basis of a spatial neighboring block adjacent to the block 1.

The spatial neighboring blocks may include B0, B1, B2, B3, and B4. Herein, it may be determined that the spatial neighboring blocks B0 and B3 included in the same merge estimation region as the block 1 is unavailable as merge candidates. Accordingly, a merge candidate of the block 1 may be derived from at least one of the spatial neighboring blocks B1, B2, and B4 excluding the spatial neighboring blocks B0 and B3.

A merge candidate of a block 3 may be derived on the basis of a spatial neighboring block adjacent to the block 3. The spatial neighboring blocks may include C0, C1, C2, C3, and C4. Herein, it may be determined that the spatial neighboring block C0 included in the same merge estimation region as the block 3 is unavailable as a merge candidate. Accordingly, a merge candidate of the block 3 may be derived from at least one of the spatial neighboring blocks C1, C2, C3, and C4 excluding the spatial neighboring block C0.

On the basis of at least one among a position, a size, a width, and a height of a merge estimation region, a merge candidate of a block included in the merge estimation region may be derived. For example, a merge candidate of multiple blocks included in a merge estimation region may be derived from at least one among a spatial neighboring block and a temporal neighboring block that are determined on the basis of at least one among a position, a size, a width, and a height of the merge estimation region. The blocks included in the merge estimation region may share the same merge candidate.

Figure 22:
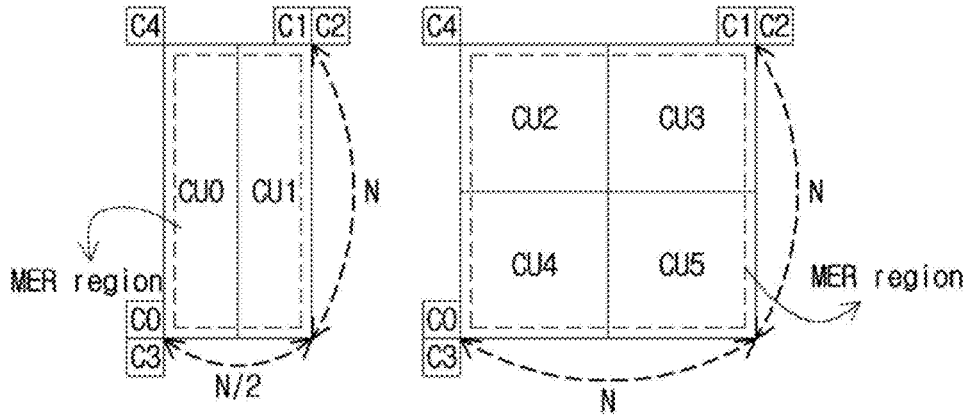
FIG. 22 is a diagram illustrating an example in which a merge candidate is derived on the basis of a merge estimation region.

FIG. 22 is a diagram illustrating an example in which a merge candidate is derived on the basis of a merge estimation region.

When multiple coding units are included in a merge estimation region, a merge candidate of the multiple coding units may be derived on the basis of the merge estimation region. That is, by using the merge estimation region as a coding unit, a merge candidate may be derived on the basis of the position, the size, or the width/height of the merge estimation region.

For example, a merge candidate of a coding unit 0 (CU0) and a coding unit 1 (CU1) both in a (n/2)×N (herein, n is N/2) size and included in a merge estimation region in a (N/2)×N size may be derived on the basis of the merge estimation region. That is, a merge candidate of the coding unit 0 and the coding unit 1 may be derived from at least one of neighboring blocks C0, C1, C2, C3, and C4 adjacent to the merge estimation region.

For example, a merge candidate of a coding unit 2 (CU2), a coding unit 3 (CU3), a coding unit 4 (CU4), and a coding unit 5 (CU5) in an n×n size included in a merge estimation region in an N×N size may be derived on the basis of the merge estimation region. That is, a merge candidate of the coding unit 2, the coding unit 3, the coding unit 4, and the coding unit 5 may be derived from at least one of the neighboring blocks C0, C1, C2, C3, and C4 adjacent to the merge estimation region.

The shape of the merge estimation region may be a square shape or a non-square shape. For example, it may be determined that a coding unit (or prediction unit) in a square shape or a coding unit (or prediction unit) in a non-square shape is a merge estimation region. The ratio between the width and the height of the merge estimation region may be limited not to exceed a predetermined range. For example, the merge estimation region is unable to have a non-square shape of which the ratio between the width and the height exceeds two, or a non-square shape of which the ratio between the width and the height is less than ½. That is, the non-square merge estimation region may be in a 2N×N or N×2N shape. Information on a limit on the ratio between the width and the height may be signaled through a bitstream. Alternatively, a limit on the ratio between the width and the height may be predefined in the encoder and the decoder.

At least one among information indicating the shape of the merge estimation region, and information indicating the size of the merge estimation region may be signaled through a bitstream. For example, at least one among the information indicating the shape of the merge estimation region, and the information indicating the size of the merge estimation region may be signaled through a slice header, a tile group header, a picture parameter, or a sequence parameter.

The shape of the merge estimation region or the size of the merge estimation region may be updated on a per-sequence basis, a per-picture basis, a per-slice basis, a per-tile group basis, a per-tile basis, or a per-block (CTU) basis. When the shape of the merge estimation region or the size of the merge estimation region is different from that of the previous unit, information indicating a new shape of the merge estimation region or a new size of the merge estimation region is signaled through a bitstream.

At least one block may be included in the merge estimation region. The block included in the merge estimation region may be in a square shape or a non-square shape. The maximum number or the minimum number of blocks that the merge estimation region is able to include may be determined. For example, three, four, or more CUs may be included in the merge estimation region. The determination may be based on information signaled through a bitstream. Alternatively, the maximum number or the minimum number of blocks that the merge estimation region is able to include may be predefined in the encoder and the decoder.

In at least one among a case where the number of blocks included in the merge estimation region is smaller than the maximum number, and a case where the number is larger than the minimum number, parallel processing of the blocks may be allowed. For example, when the number of blocks included in the merge estimation region is equal to or smaller than the maximum number, or when the number of blocks included in the merge estimation region is equal to or larger than the minimum number, a merge candidate of the blocks is derived on the basis of the merge estimation region. When the number of blocks included in the merge estimation region is larger than the maximum number, or when the number of blocks included in the merge estimation region is smaller than the minimum value, a merge candidate of each of the blocks is derived on the basis of the size, the position, the width, or the height of each of the blocks.

Information indicating the shape of the merge estimation region may include a one-bit flag. For example, the syntax "isrectagular_mer_flag" may indicate that the merge candidate region in a square shape or a non-square shape. The isrectagular_mer_flag value of one may indicate that the merge estimation region in a non-square shape, and the isrectagular_mer_flag value of zero may indicate that the merge estimation region in a square shape.

When the information indicates that the merge estimation region in a non-square shape, information indicating at least one among the width, the height, and the ratio between the width and the height of the merge estimation region is signaled through a bitstream. On the basis of this, the size and/or the shape of the merge estimation region may be determined.

A block in a quadrangular shape may be partitioned into multiple triangular blocks. A merge candidate of triangular blocks may be derived on the basis of a quadrangular block including the triangular blocks. Triangular blocks may share the same merge candidate.

As in the above-described example, a block to be subjected to inter prediction and a block that is the basis of derivation of a merge candidate may be set different. When the block to be subjected to inter prediction is different from the block that is the basis of derivation of a merge candidate, a merge candidate list for the current block is constructed considering motion information of a neighboring block or a merge index of a neighboring block.

For example, when a merge candidate of the current block is derived on the basis of a high-level node block including the current block, it is determined that a merge candidate having the same motion information as the neighboring block included in the high-level node block or a merge candidate the same as the merge candidate indicated by the merge index of the neighboring block is unavailable as a merge candidate of the current block.

Figure 23A:
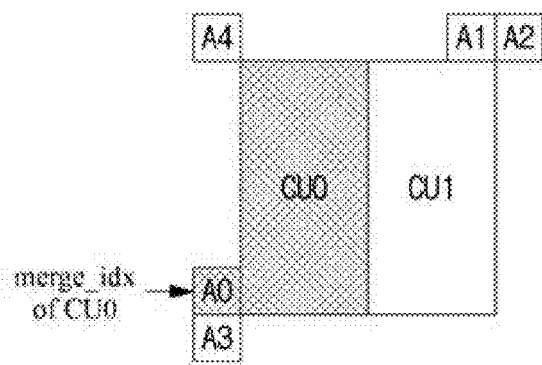
FIGS. 23A and 23B are diagrams illustrating an example of determining a merge candidate list for a current block on the basis of a merge index of a neighboring block.
Figure 23B:
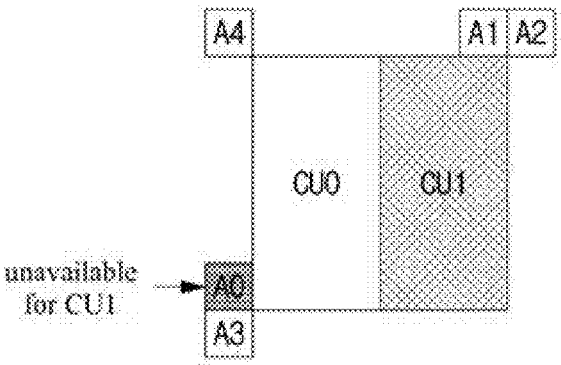

FIGS. 23A and 23B are diagrams illustrating an example of determining a merge candidate list for a current block on the basis of a merge index of a neighboring block.

A block 0 and a block 1 may be blocks included in one parallel-derivation region. Alternatively, a block 0 and a block 1 may be included in a high-level node block that is the basis of the derivation of a merge candidate. In FIGS. 23A and 23B, it is illustrated that the block 0 and the block 1 are non-square blocks, but an embodiment described below may be applied to even a case where the block 0 and the block 1 are triangular blocks or square blocks.

A merge candidate of the block 0 may be derived on the basis of a square block including the block 0. For example, a merge candidate of the block 0 may be derived on the basis of at least one among A0, A1, A2, A3, and A4 adjacent to a square block including the block 0. A merge index for the block 0 may be encoded, and motion information of a merge candidate indicated by a merge index may be set as motion information of the block 0.

A merge candidate of the block 1 may be derived on the basis of a square block including the block 1. For example, a merge candidate of the block 1 may be derived on the basis of at least one among A0, A1, A2, A3, and A4 adjacent to a square block including the block 1. Herein, it may be determined that a merge candidate having motion information the same as motion information of the block 0, or a merge candidate indicated by a merge index of the block 0 is unavailable as a merge candidate of the block 1. For example, when the merge index of the block 0 indicates A1, A1 is not included in the merge candidate list for the block 1. That is, a merge candidate list for the block 0 excluding the merge candidate indicated by the merge index of the block 0 may be set as a merge candidate list for the block 1.

Even when the block 0 is not encoded using a merge mode, a merge candidate having the same motion information as the block 0 is set to be unavailable as a merge candidate of the block 1.

A merge candidate of a block 2, a block 3, and a block 4 may be derived on the basis of a high-level node block including the same. Herein, a merge candidate having the same motion information as the block 2, or a merge candidate indicated by a merge index of the block 2 may be set to be unavailable as a merge candidate of the block 3. In addition, a merge candidate having the same motion information as the block 3, or a merge candidate indicated by a merge index of the block 3 may be set to be unavailable as a merge candidate of the block 4. That is, a merge candidate list for the block 3 and the block 4 may not include a merge candidate having the same motion information as a neighboring block adjacent to each block.

Information indicating the same merge candidate as the motion information of the current block may be signaled through a bitstream. The information may be index information that indicates at least one of multiple merge candidates included in a merge candidate list. The index information may indicate an index (or, merge index) of at least one of multiple merge candidates included in the merge candidate list. The motion information of the current block may be set the same as the motion information of the merge candidate indicated by the index information.

Motion information of the current block may be derived from multiple merge candidates. That is, motion information of the current block may be derived by selecting two or more of the merge candidates included in the merge candidate list for the current block.

Figure 24:
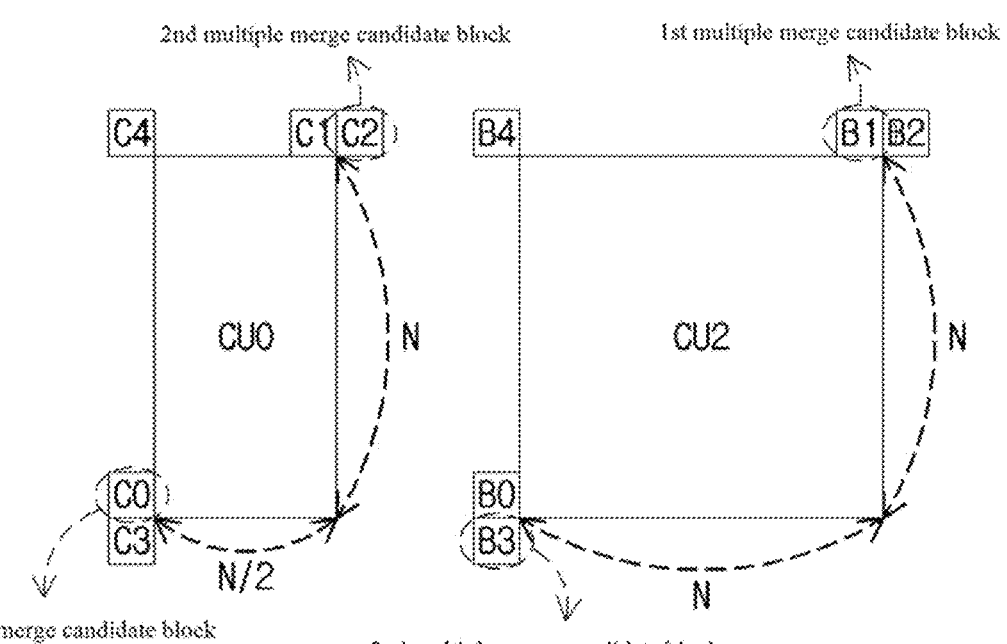
FIG. 24 is a diagram illustrating an example of acquiring motion information of a current block on the basis of multiple merge candidates.

FIG. 24 is a diagram illustrating an example of acquiring motion information of a current block on the basis of multiple merge candidates.

A merge candidate list for a coding unit 0 may include a merge candidate derived from a neighboring block adjacent to the coding unit 0. For example, a merge candidate list for the coding unit 0 may include at least one among C0, C1, C2, C3, and C4.

Multiple merge candidates may be selected so as to acquire motion information of the coding unit 0. For example, C0 and C2 may be selected among the merge candidates included in the merge candidate list, and on the basis of the selected merge candidates, motion information of the coding unit 0 may be determined.

A merge candidate list for a coding unit 1 may include a merge candidate derived from a neighboring block adjacent to the coding unit 0. For example, a merge candidate list for the coding unit 1 may include at least one among B0, B1, B2, B3, and B4.

Multiple merge candidates may be selected so as to acquire motion information of the coding unit 1. For example, B1 and B3 may be selected among the merge candidates included in the merge candidate list, and on the basis of the selected merge candidates, motion information of the coding unit 1 may be determined.

In an embodiment described below, N merge candidates selected among multiple merge candidates included in a merge candidate list so as to determine a motion vector of the current block may be referred to as a first merge candidate, a second merge candidate, . . . , an N-th merge candidate, respectively. The order of names may be determined by the merge indexes of the merge candidates. For example, a first merge candidate refers to a merge candidate having the lowest merge index among the N merge candidates, and an N-th merge candidate refers to a merge candidate having the highest merge index among the N merge candidates.

A motion vector of the current block may be determined on the basis of a value obtained by adding motion vectors of multiple merge candidates, or a value obtained by scaling at least one motion vector. Alternatively, a motion vector of the current block may be determined on the basis of a weighted sum operation or an average operation of motion vectors of multiple merge candidates.

Equation 1 represents an example of deriving a motion vector of the current block by adding a motion vector of the first merge candidate and a motion vector of the second merge candidate.

$$mvL0 = mvL0\_1 + mvL0\_2 \qquad \text{[Equation 1]}$$
$$mvL1 = mvL1\_1 + mvL1\_2$$

In Equation 1 above, mvL0 denotes a motion vector L0 of the current block, and mvL1 denotes a motion vector L1 of the current block. The expression mvL0_N (N is one or two) denotes a motion vector L0 of an N-th merge candidate, and the expression mvL1_N denotes a motion vector L1 of an N-th merge candidate.

A motion vector of the current block may be derived by adding values obtained by scaling a first motion vector and a second motion vector. Equation 2 represents an example of deriving a motion vector of the current block by adding a motion vector of the first merge candidate and a scaled motion vector of the second merge candidate.

$$mvL0 = mvL0\_1 + (mvL0\_2 \gg M) \qquad \text{[Equation 2]}$$
$$mvL1 = mvL1\_1 + (mvL1\_2 \gg M)$$

In Equation 2, the letter M denotes a scale parameter. Information for determining a scale parameter may be signaled through a bitstream. The scale parameter may be determined on a per-slice basis, or a per-block basis. Alternatively, a scale parameter may be determined on the basis of the difference in output order (for example, POC) between a reference picture of the first merge candidate and a reference picture of the second merge candidate. Alternatively, a scale parameter may be determined on the basis of the difference in merge indexes between the first merge candidate and the second merge candidate. For example, when the merge index of the first merge candidate is n and the merge index of the second merge candidate is m, a scale parameter M is determined to m-n.

An average value of motion vectors of multiple merge candidates may be determined as a motion vector of the current block. Equation 3 represents an example of determining an average value of motion vectors of the first merge candidate and the second merge candidate as a motion vector of the current block. Represented is an example of deriving a motion vector of the current block by adding a motion vector of the first merge candidate and a scaled motion vector of the second merge candidate.

$$mvL0 = (mvL0\_1 + mvL0\_2) \gg 1 \qquad \text{[Equation 3]}$$
$$mvL1 = (mvL1\_1 + mvL1\_2) \gg 1$$

At least one among a reference picture index, a bi-directional prediction flag, and a bi-directional prediction weight of the current block may be set the same as that of any one of multiple merge candidates. For example, at least one among a reference picture index, a bi-directional prediction flag, and a bi-directional prediction weight of the current block may be set the same as that of the merge candidate having the lowest merge index or the merge candidate having the highest index among the multiple merge candidates. Alternatively, at least one among a reference picture index, a bi-directional prediction flag, and a bi-directional prediction weight of the current block may be derived from the merge candidate selected by the first or the last index information among multiple pieces of index information.

Information indicating whether motion information of the current block is determined on the basis of multiple merge candidates may be signaled through a bitstream. The information may be a one-bit flag. Alternatively, the information may indicate the number of merge candidates for determining motion information of the current block. For example, the information of the value of one may indicate that motion information of the current block is determined on the basis of one merge candidate. The information of the value of 01 may indicate that motion information of the current block is determined on the basis of two merge candidates. The information of the value of 11 may indicate that motion information of the current block is determined on the basis of three merge candidates. More than three merge candidates may be used.

Alternatively, it may be set when a merge candidate indicated by index information of the current block is encoded using uni-directional prediction (that is, has only uni-directional motion information), an additional merge candidate is selected.

Index information identifying each of multiple merge candidates may be signaled through a bitstream. For example, the first merge candidate may be selected on the basis of first index information, and the second merge candidate may be selected on the basis of second index information. Herein, the second index information may indicate any one of the merge candidates excluding the first merge candidate.

Alternatively, the first merge candidate may be determined on the basis of index information, and the second merge candidate may be determined by adding/subtracting offset from the merge index of the first merge candidate. The offset may be a natural number of one, two, three, four, or the like. The offset value may be predefined in the encoder and the decoder. Alternatively, information for determining the offset value may be signaled through a bitstream.

Alternatively, the first merge candidate may be determined on the basis of index information, and the merge candidate spatially adjacent to the first merge candidate may be determined as the second merge candidate. For example, when the first merge candidate corresponds to a neighboring block adjacent to the left side of the current block, a merge candidate derived from a block adjacent to the bottom left corner of the current block, or a merge candidate derived from a block adjacent to the top left corner of the current block is determined as the second merge candidate.

Alternatively, the first merge candidate may be determined on the basis of index information, and a merge candidate predetermined in the encoder and the decoder may be determined as the second merge candidate. The predetermined merge candidate may be the merge candidate having the lowest merge index or the merge candidate having the highest merge index among the merge candidates included in the merge candidate list.

Alternatively, the first merge candidate may be determined on the basis of index information, and the merge candidate having the same reference picture as the first merge candidate may be determined as the second merge candidate. When there are multiple merge candidates having the same reference picture as the first merge candidate, the merge candidate having the lowest index value, the merge candidate having the smallest difference in an index value with the first merge candidate, or the merge candidate encoded using bi-directional prediction is selected.

Alternatively, when the first merge candidate determined on the basis of the index information is encoded using first direction prediction, a merge candidate having second direction motion information is selected as the second merge candidate. When there are multiple merge candidates having first direction motion information, the merge candidate having the lowest index value, the merge candidate having the smallest difference in an index value with the first merge candidate, or the merge candidate encoded using bi-directional prediction is selected.

Instead of selecting multiple merge candidates, a merge candidate generated by combining multiple merge candidates may be added to the merge candidate list. For example, when the number of merge candidates included in the merge candidate list is smaller than the maximum number of merge candidates, an average merge candidate having an average value of motion vectors of multiple merge candidates as a motion vector is added to the merge candidate list.

The application of the embodiments described focusing on the decode process or encoding process to the encoding process or decoding process is included in the scope of the present invention. The change of the embodiments described in a predetermined order into a different order is also included in the scope of the present invention.

Although the above-described embodiments have been described on the basis of a series of steps or flowcharts, they are not intended to limit the inventive time-series order, and may be performed simultaneously or in a different order. In addition, each of the components (for example, units, modules, etc.) constituting the block diagram in the above-described embodiment may be implemented as a hardware device or software, and a plurality of components may be combined into one hardware device or software. The above-described embodiments may be implemented in the form of program instructions that may be executed through various computer components and recorded in a computer-readable recording medium. The computer-readable storage medium may include a program instruction, a data file, a data structure, and the like either alone or in combination thereof. Examples of the computer-readable storage medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. The hardware devices may be configured to be operated by one or more software modules or vice versa to conduct the processes according to the present invention.

INDUSTRIAL APPLICABILITY

The present invention may be applied to an electronic device capable of encoding/decoding an image.

The invention claimed is:

1. A method of decoding an image, the method comprising:

deriving one or more merge candidates for a current block, the one or more merge candidates comprising at least one of a spatial merge candidate and a temporal merge candidate;

generating a merge candidate list by adding the merge candidates to the merge candidate list;

obtaining motion information of the current block based on the merge candidate list;

obtaining a prediction sample of the current block based on the motion information; and obtaining a reconstruction sample based on the prediction sample, wherein when the number of the merge candidates included in the merge candidate list is less than a threshold, a motion information candidate included in a motion information candidate list is added to the merge candidate list as a merge candidate, wherein the motion information candidate included in the motion information candidate list is derived based on motion information of a spatial block that is included in the same slice as the current block, and wherein after adding the motion information candidate to the merge candidate list, an average merge candidate generated by using two merge candidates included in the merge candidate list is added to the merge candidate list.

2. The method of claim 1, wherein the motion information candidate list is updated with the motion information of the current block, and wherein a new motion information candidate derived based on the motion information of the current block is added with a largest index to the motion information candidate list.

3. The method of claim 1, wherein if a first motion information candidate with a largest index in the motion information candidate list is the same with one of the merge candidates included in the merge candidate list, a second motion information candidate with an index smaller than the first motion information candidate is added to the merge candidate list.

4. The method of claim 1, wherein the motion information candidate list is initialized when a new slice is encountered.

5. The method of claim 1, wherein a motion vector of the average merge candidate is derived by averaging motion vectors of the two merge candidates.

6. A method of encoding an image, the method comprising:

deriving one or more merge candidates of a current block, the one or more merge candidates comprising at least one of a spatial merge candidate and a temporal merge candidate;

generating a merge candidate list by adding the merge candidates to the merge candidate list;

obtaining motion information of the current block based on the merge candidate list;

obtaining a prediction sample of the current block based on the motion information; and obtaining a residual sample of the current block based on the prediction sample, wherein when the number of the merge candidates included in the merge candidate list is less than a threshold, a motion information candidate included in a motion information candidate list is added to the merge candidate list as a merge candidate, wherein the motion information candidate included in the motion information candidate list is derived based on motion information of a spatial block that is included in the same slice as the current block, and wherein after adding the motion information candidate to the merge candidate list, an average merge candidate generated by using two merge candidates included in the merge candidate list is added to the merge candidate list.

7. A method of transmitting compressed video data, the method comprising:

obtaining the compressed video data; and transmitting the compressed video data, wherein obtaining the compressed video data comprises:

deriving one or more merge candidates of a current block,
the one or more merge candidates comprising at least
one of a spatial merge candidate and a temporal merge
candidate;

generating a merge candidate list by adding the merge
candidates to the merge candidate list;

obtaining motion information of the current block based
on the merge candidate list;

obtaining a prediction sample of the current block based
on the motion information; and obtaining a residual sample of the current block based on
the prediction sample, wherein when the number of the merge candidates
included in the merge candidate list is less than a
threshold, a motion information candidate included in
a motion information candidate list is added to the
merge candidate list as a merge candidate, wherein the motion information candidate included in the
motion information candidate list is derived based on
motion information of a spatial block that is included in
the same slice as the current block, and wherein after adding the motion information candidate to
the merge candidate list, an average merge candidate
generated by using two merge candidates included in
the merge candidate list is added to the merge candidate
list.

*   *   *   *   *